(12) United States Patent
Kishizoe

(10) Patent No.: US 11,897,288 B2
(45) Date of Patent: Feb. 13, 2024

(54) PNEUMATIC TIRE

(71) Applicant: The Yokohama Rubber Co., LTD., Tokyo (JP)

(72) Inventor: Isamu Kishizoe, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 955 days.

(21) Appl. No.: 16/603,814

(22) PCT Filed: May 22, 2018

(86) PCT No.: PCT/JP2018/019721
§ 371 (c)(1),
(2) Date: Oct. 8, 2019

(87) PCT Pub. No.: WO2018/225501
PCT Pub. Date: Dec. 13, 2018

(65) Prior Publication Data
US 2021/0331526 A1 Oct. 28, 2021

(30) Foreign Application Priority Data

Jun. 8, 2017 (JP) .................................. 2017-113786

(51) Int. Cl.
*B60C 11/11* (2006.01)
*B60C 11/12* (2006.01)
(Continued)

(52) U.S. Cl.
CPC .......... *B60C 11/11* (2013.01); *B60C 11/0327* (2013.01); *B60C 11/1236* (2013.01);
(Continued)

(58) Field of Classification Search
CPC ..... B60C 11/1376; B60C 11/03; B60C 11/11; B60C 11/12; B60C 11/1236;
(Continued)

(56) References Cited

U.S. PATENT DOCUMENTS

2009/0101259 A1  4/2009  Ebiko
2013/0139937 A1*  6/2013  Gayton ................... B60C 11/04
                                                                152/209.18
2018/0333992 A1  11/2018  Gayton et al.

FOREIGN PATENT DOCUMENTS

EP  3 164 271      5/2017
JP  H1178434 A *  3/1999 ..... B60C 2011/1231
(Continued)

OTHER PUBLICATIONS

International Search Report for International Application No. PCT/JP2018/019721 dated Aug. 21, 2018, 4 pages, Japan.
(Continued)

*Primary Examiner* — Justin R Fischer
*Assistant Examiner* — Philip N Schwartz
(74) *Attorney, Agent, or Firm* — Thorpe North & Western

(57) ABSTRACT

In a pneumatic tire, a block includes recess/protrusions on a road contact surface. Additionally, a recess/protrusion height of the recess/protrusions is from 0.1 mm to 1.0 mm. A width of the recess/protrusions is from 0.1 mm to 0.8 mm. A recess/protrusion region is where an arrangement interval between adjacent recess/protrusions is not greater than 1.2 mm. A smooth region other than the recess/protrusion region has an arithmetic mean roughness of the road contact surface of the block not greater than 50 μm. A lateral length of the road contact surface of the block in a tire lateral direction is defined. In this case, the block includes the recess/protrusion region and the smooth region in an optional cross-section in a lateral range of not less than 40% of a lateral length of the road contact surface of the block.

12 Claims, 44 Drawing Sheets

(51) Int. Cl.
  *B60C 11/13* (2006.01)
  *B60C 11/03* (2006.01)
(52) U.S. Cl.
  CPC ...... *B60C 11/1259* (2013.01); *B60C 11/1376* (2013.01); *B60C 2011/036* (2013.01); *B60C 2011/0362* (2013.01); *B60C 2011/129* (2013.01)
(58) Field of Classification Search
  CPC ............ B60C 11/1259; B60C 11/0327; B60C 2011/036; B60C 2011/0362; B60C 2011/129; B60C 2011/1231
  See application file for complete search history.

(56) References Cited

FOREIGN PATENT DOCUMENTS

| | | | | |
|---|---|---|---|---|
| JP | 2006-151222 | 6/2006 | | |
| JP | 2006-327245 | 12/2006 | | |
| JP | 2006-341792 | 12/2006 | | |
| JP | 4571482 | 10/2010 | | |
| JP | 2013-136279 | 7/2013 | | |
| JP | 2013136279 A | * 7/2013 | ............ | B60C 11/00 |
| JP | 2014-231268 | 12/2014 | | |
| JP | 2015-089724 | 5/2015 | | |
| JP | 2015089724 A | * 5/2015 | ......... | B60C 11/1376 |
| JP | 2017-210169 | 11/2017 | | |
| WO | WO 2006/132216 | 12/2006 | | |
| WO | WO 2012/004285 | 1/2012 | | |
| WO | WO 2016/000854 | 1/2016 | | |
| WO | WO 2016/084985 | 6/2016 | | |
| WO | WO-2016084985 A1 | * 6/2016 | ............ | B60C 11/00 |

OTHER PUBLICATIONS

European Search Report for European Application No. 18813360.7 dated Dec. 21, 2020, 9 pages, Germany.

* cited by examiner

VIEWED ALONG LINE X

VIEWED ALONG LINE P-P

VIEWED ALONG LINE Q

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| RECESS/PROTRUSION REGION/SMOOTH REGION | RECESS/PROTRUSION REGION ONLY | MIXED | MIXED | MIXED | MIXED | MIXED | MIXED | MIXED | MIXED | MIXED |
| Hc (mm) | 0.2 | 0.2 | 0.2 | 0.2 | 0.2 | 0.2 | 0.2 | 0.4 | 0.2 | 0.2 |
| Wc (mm) | 0.2 | 0.2 | 0.2 | 0.2 | 0.2 | 0.2 | 0.2 | 0.4 | 0.2 | 0.2 |
| Dc (mm) | 0.3 | 0.3 | 0.3 | 0.3 | 0.3 | 0.3 | 0.3 | 0.6 | 0.2 | 1.0 |
| W1 (mm) | 50.0 | 12.0 | 6.0 | 2.0 | 5.0 | 4.0 | 2.5 | 5.0 | 5.0 | 5.0 |
| W2 (mm) | - | 12.0 | 6.0 | 2.0 | 4.0 | 6.0 | 5.0 | 5.0 | 5.0 | 5.0 |
| NUMBER OF RECESS/PROTRUSION REGIONS DISPOSED | 1 | 2 | 4 | 10 | 4 | 4 | 4 | 4 | 4 | 4 |
| W1/W2 | - | 1.00 | 1.00 | 1.00 | 1.25 | 0.67 | 0.50 | 1.00 | 1.00 | 1.00 |
| ΣW1/Lb' | 1.00 | 0.50 | 0.50 | 0.42 | 0.42 | 0.33 | 0.21 | 0.42 | 0.42 | 0.42 |
| Dc/Wc | 1.50 | 1.50 | 1.50 | 1.50 | 1.50 | 1.50 | 1.50 | 1.50 | 1.00 | 5.00 |
| W2/Dc | - | 40.0 | 20.0 | 6.7 | 13.3 | 20.0 | 16.7 | 8.3 | 25.0 | 5.0 |
| BRAKING PERFORMANCE ON ICE | 100 | 110 | 115 | 107 | 105 | 105 | 103 | 117 | 108 | 107 |
| DRIVING PERFORMANCE ON ICE | 100 | 107 | 112 | 105 | 104 | 104 | 102 | 114 | 106 | 106 |

FIG. 44

PNEUMATIC TIRE

TECHNICAL FIELD

The technology relates to a pneumatic tire and particularly relates to a pneumatic tire allowing improvement in performance on ice delivered at the start of using a new tire.

BACKGROUND ART

In general, at the start of using a new tire, there is a problem in that the inherent functions of the tread rubber fail to be appropriately provided, thus preventing performance on ice from being appropriately obtained. Accordingly, in recent studless tires, a plurality of narrow shallow grooves are disposed in a block road contact surface in order to ensure appropriate performance on ice at the start of using a new tire. Such narrow shallow grooves have a groove depth much smaller than that of sipes and small enough to disappear at the early stages of wear of the tire. As an example of a conventional pneumatic tire having such a configuration, the technology described in Japan Patent No. 4571482 is known.

SUMMARY

The technology provides a pneumatic tire allowing improvement in performance on ice delivered at the start of using a new tire.

The pneumatic tire according to an embodiment of the technology is a pneumatic tire including a plurality of blocks on a tread surface, the blocks each comprising a plurality of recess/protrusion portions on a road contact surface, a recess/protrusion height Hc of each of the recess/protrusion portions being in a range 0.1 mm≤Hc≤1.0 mm, a width Wc of each of the recess/protrusion portions being in a range 0.1 mm≤Wc≤0.8 mm, a recess/protrusion region being defined as a region where an arrangement interval Dc between the recess/protrusion portions adjacent to each other is in a range Dc≤1.2 mm, a smooth region being defined as a region other than the recess/protrusion region and in which an arithmetic average roughness Ra of the road contact surface of the block is in a range Ra≤50 μm, a cross-section X perpendicular to a tire lateral direction being defined, a lateral length Wb of the road contact surface of the block in the tire lateral direction being defined, and the blocks each including the recess/protrusion region and the smooth region in an optional cross-section X within a lateral range of not less than 40% of the lateral length Wb of the road contact surface of the block.

In the pneumatic tire according to an embodiment of the technology, the road contact surface of the block includes the recess/protrusion region including densely-disposed, fine recess/protrusion portions, and thus the recess/protrusion region absorbs and removes a water film from an icy road surface. Additionally, since the road contact surface of the block includes a flat smooth region, the appropriate contact area of the block on the icy road surface is provided. A mixed arrangement of the recess/protrusion region and the smooth region improves the adhesive friction force of the smooth region acting on the icy road surface. This has the advantage of improving the grounding characteristics of the block on the icy road surface, thus synergistically improving tire performance on ice.

BRIEF DESCRIPTION OF DRAWINGS

FIG. 44 is a table showing results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology; and obviously substitutable elements. Furthermore, the modified examples described in the embodiments can be combined as desired within the scope apparent to one skilled in the art.

Pneumatic Tire

Figure 1:
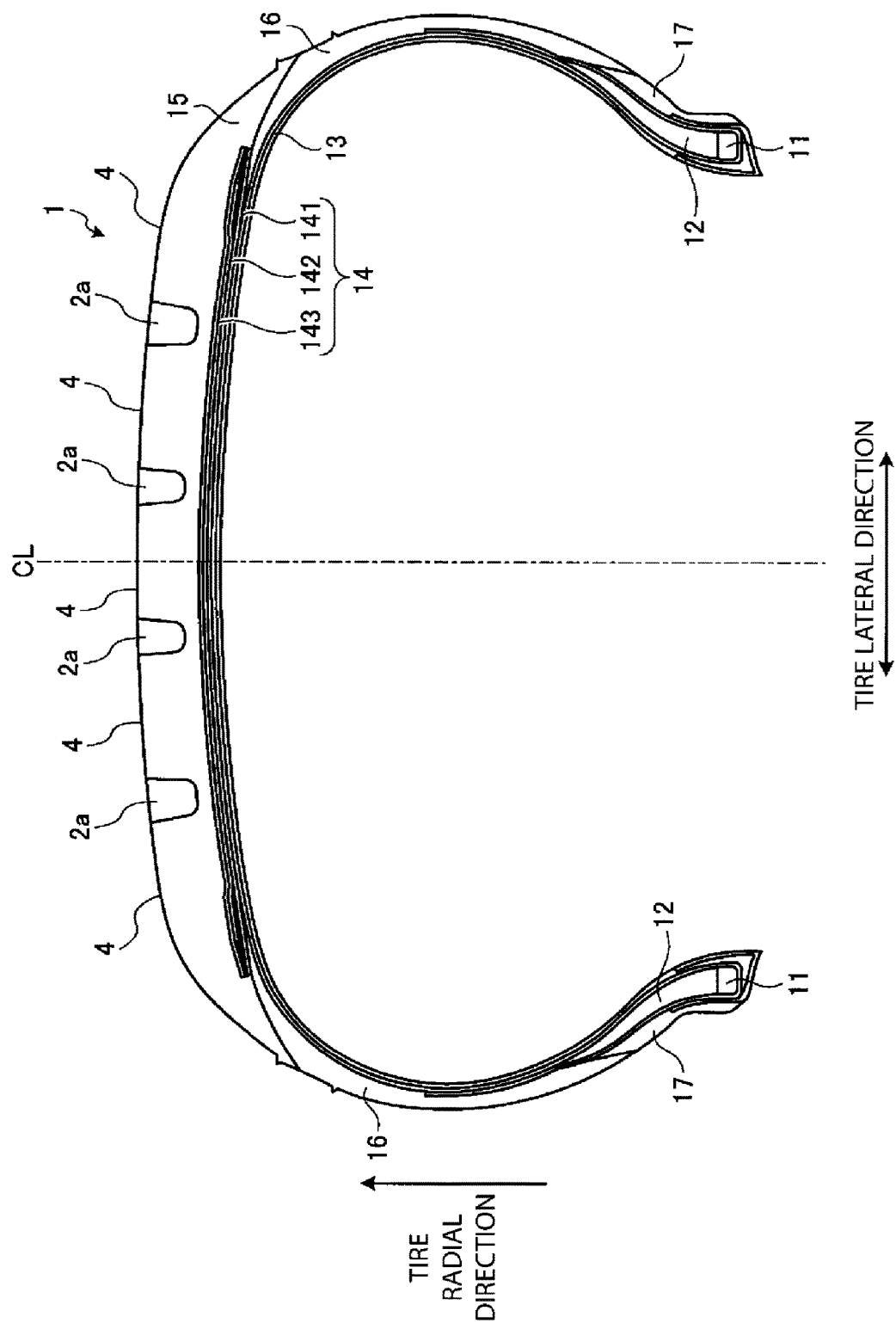
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross-section in a tire meridian direction" refers to a cross-section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed outward of the pair of bead cores 11, 11 in the tire radial direction and constitute the bead portions.

The carcass layer 13 has a single layer structure made of one carcass ply or a multilayer structure made of a plurality of carcass plies and extends between the left and right bead cores 11, 11 in a toroidal shape, forming the framework of the tire. Additionally, both end portions of the carcass layer 13 are turned back outward in the tire lateral direction so as to wrap around the bead cores 11 and the bead fillers 12 and fixed. The carcass ply (plies) of the carcass layer 13 is made by performing a rolling process on coating rubber-covered carcass cords made of steel or an organic fiber material (e.g. aramid, nylon, polyester, rayon, or the like). The carcass ply (plies) has a carcass angle (inclination angle of the fiber direction of the carcass cords with respect to the tire circumferential direction), as an absolute value, ranging from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is made by performing a rolling process on coating-rubber-covered cords made of steel or an organic fiber material. The belt cover 143 has a belt angle, as an absolute value, ranging from 0 degrees to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
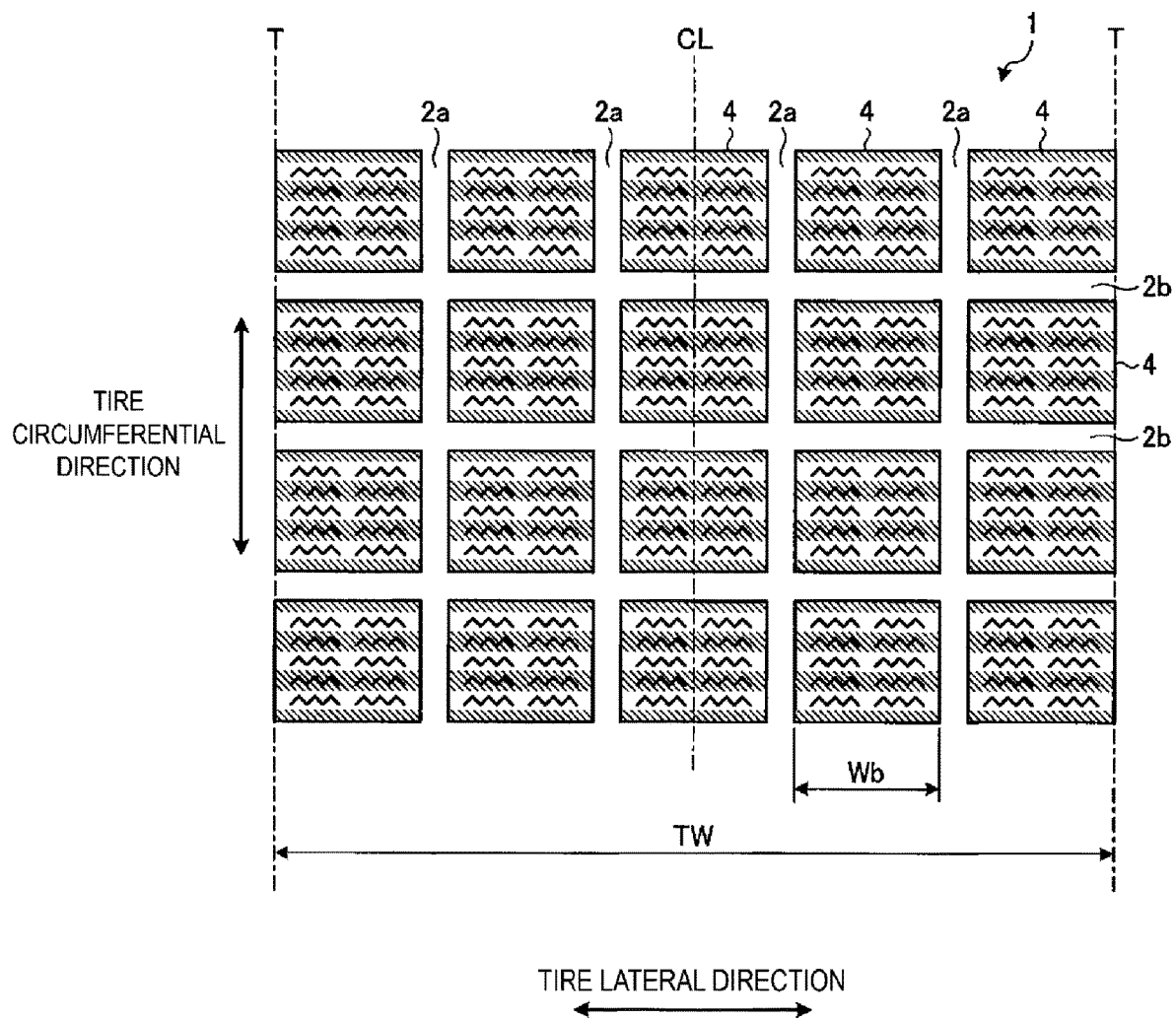
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates, by way of example, a simple tread pattern with grooves arranged in a lattice-like manner. In reference to the same drawing, "tire circumferential direction" refers to the direction revolving about the tire rotation axis. Reference sign T denotes a tire ground contact edge.

The pneumatic tire includes a plurality of grooves 2a, 2b and blocks 4 defined by the grooves 2a, 2b, the grooves 2a, 2b and the blocks 4 being formed in the tread portion.

The grooves 2a, 2b are grooves defining the blocks 4, and have a groove width of not less than 2.0 mm and a groove depth of not less than 3.0 mm.

The groove width is the maximum distance between the left and right groove walls at the groove opening portion and is measured when the tire is mounted on a specified rim, inflated to the specified internal pressure, and in an unloaded state. In a configuration in which a land portion includes a notch portion or a chamfered portion at an edge portion of the land portion, the groove width is measured with reference to intersection points where a tread contact surface and extension lines of the groove walls meet, in a cross-sectional view in which the normal direction corresponds to the groove length direction. Additionally, in a configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

The block 4 is a land portion defined by the grooves 2a, 2b having the predetermined groove width and groove depth as described above and includes a road contact surface in a ground contact region of the tire. Additionally, the block 4 may include sipes 5 (see FIG. 3 described below) in the road contact surface or may include a chamfered portion or notch portion (not illustrated) at the edge portion. Additionally, the blocks 4 may have narrow grooves and shallow grooves (not illustrated) on the road contact surface that are not included in the grooves 2a, 2b described above.

The road contact surface of the block is defined as an outer surface of the block in a region between right and left tire ground contact edges T, T (i.e., the ground contact region of the tire).

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Additionally, a lateral length Wb of the block 4 is preferably in a range $0.10 \leq Wb/TW$ with respect to a tire ground contact width TW. This provides the appropriate ground contact width of the block 4 (corresponding dimensional sign is omitted from the drawing).

The lateral width Wb of the block is the maximum width of the road contact surface of the block in the tire lateral direction measured in a case where the tire is mounted on a specified rim, inflated to the specified internal pressure, and in an unloaded state.

The tire ground contact width TW is measured as the maximum distance in the tire axial direction of the left and right tire ground contact edges.

For example, in the configuration of FIG. 2, the grooves 2a are circumferential main grooves and extend continuously all around the circumference of the tire. Additionally, four circumferential main grooves 2a having a straight shape are disposed laterally symmetrically about the tire equatorial plane CL. Additionally, the grooves 2b are through lug grooves penetrating the tread surface in the tire lateral direction and opening at the left and right tire ground contact edges T. Additionally, the plurality of the grooves 2a, 2b are arranged in a lattice-like manner and communicate with one another to define five rows of blocks in the tire lateral direction.

"Main groove" refers to a groove on which a wear indicator is required to be provided as specified by JATMA and typically has a groove width of not less than 5.0 mm and a groove depth of not less than 6.5 mm Note that, in the configuration of FIG. 2, the groove 2a has a straight shape as described above but that no such limitation is intended and that the groove 2a may have a zigzag shape or a wave-like shape in which the groove 2a extends while bending or curving in the tire circumferential direction (not illustrated).

Block Sipe

Figure 3:
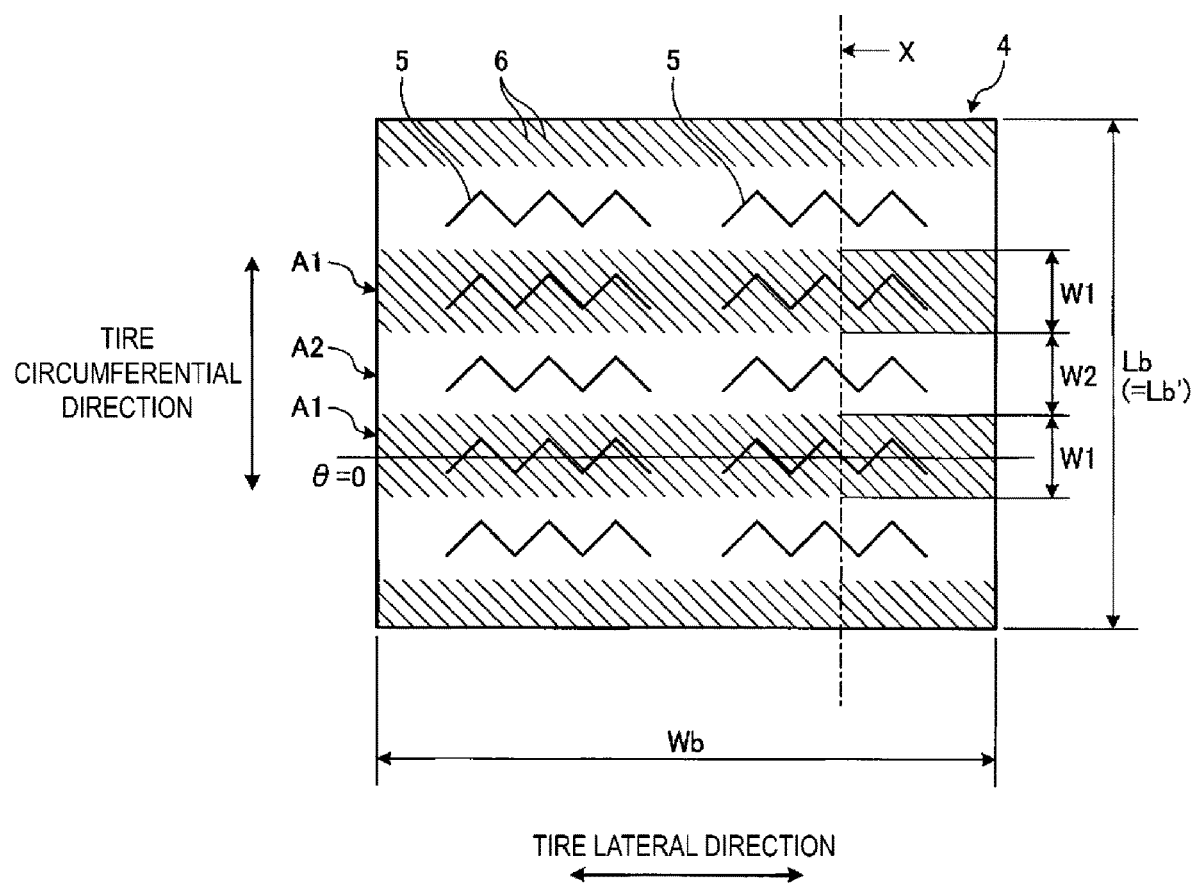
FIG. 3 is a plan view illustrating a road contact surface of a block illustrated in FIG. 2.

FIG. 3 is a plan view illustrating the road contact surface of the block illustrated in FIG. 3. The same drawing illustrates one block 4 defined by grooves 2a, 2b (see FIG. 2).

As illustrated in FIGS. 2 and 3, in the pneumatic tire 1, each of the blocks 4 includes a plurality of the sipes 5. The sipes 5 increase edge components of the block 4 to improve performance on ice and snow of the tire.

The sipe is a cut formed in a land portion. The sipe has a sipe width of less than 1.0 mm and a sipe depth of not less than 2.0 mm and closes when the tire comes into contact with the ground. Note that the maximum value of the sipe depth is not particularly limited but is typically less than the groove depth of the main grooves.

The sipe width is measured as the maximum distance of the opening width of the sipe at the ground contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state.

Additionally, in a configuration in which a sipe includes partial recess/protrusion portions on the groove bottom, the sipe depth is measured excluding this portion.

Additionally, the sipe 5 may have any of the following structures: a closed structure in which the sipe 5 terminates within the block 4 at both end portions (see FIG. 3), a semi-closed structure in which the sipe 5 opens at the edge portion of the block 4 at one end portion and terminates within the block 4 at the other end portion (not illustrated), and an open structure in which the sipe 5 opens at the edge portion of the block 4 at both end portions. Additionally, the length, number, and layout of the sipes 5 in the block 4 can be appropriately selected within the scope apparent to one skilled in the art. Additionally, the sipe 5 can extend in the tire lateral direction, the tire circumferential direction, or any direction inclined with respect to these directions.

For example, in the configuration of FIG. 3, the one block 4 includes the plurality of the sipes 5. Additionally, the sipes 5 have the closed structure in which the sipes 5 terminate within the block 4 at both end portions and have a zigzag shape extending in the tire lateral direction. Additionally, the sipes 5 are disposed side by side at a predetermined interval in the tire circumferential direction, and two columns of the sipes 5 are disposed in each of the left and right regions of the central portion of the blocks 4.

Recess/Protrusion Portions of Block

Figure 4:
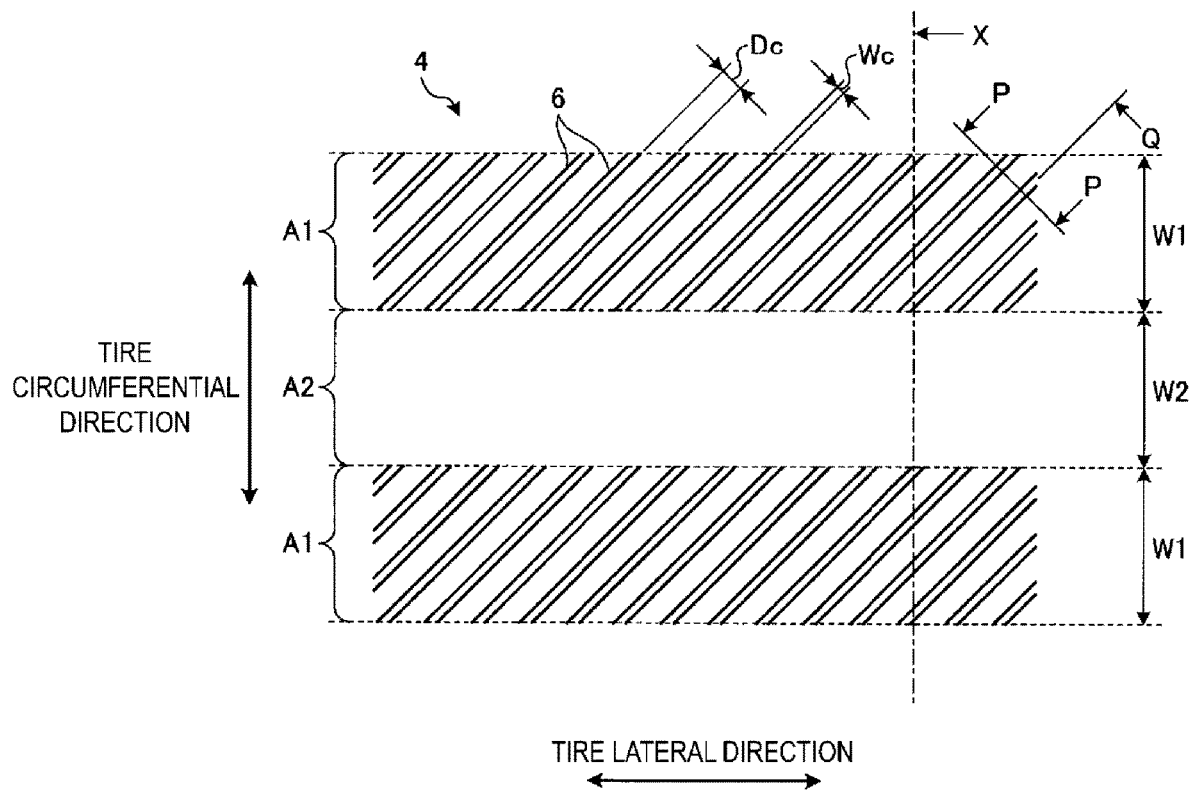
FIG. 4 is an enlarged view illustrating the road contact surface of the block illustrated in FIG. 3.
Figure 5:
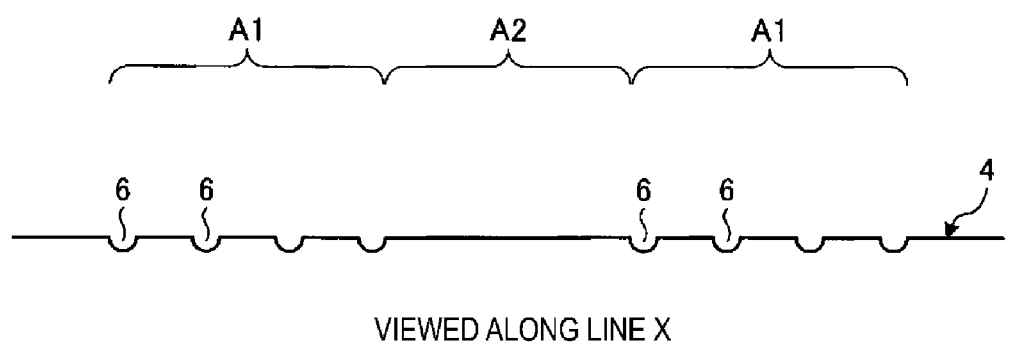
FIG. 5 is a cross-sectional view, taken along line X, of the road contact surface of the block illustrated in FIG. 4.
Figure 6:
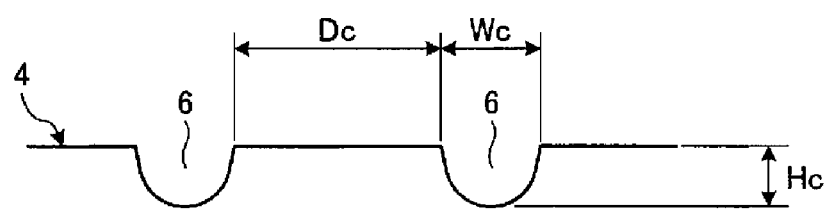
FIG. 6 is a cross-sectional view taken along line P-P and illustrating recess/protrusion portions illustrated in FIG. 4.
Figure 7:
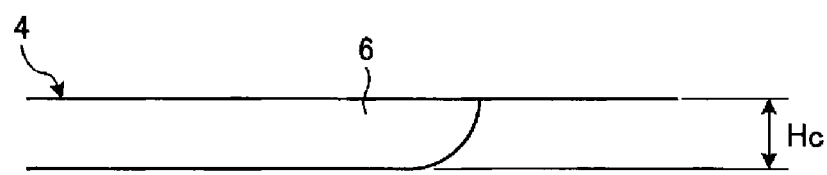
FIG. 7 is a cross-sectional view, taken along line Q, of the recess/protrusion portions illustrated in FIG. 4.

FIG. 4 is an enlarged view illustrating the road contact surface of the block illustrated in FIG. 3. FIG. 5 is a cross-sectional view, taken along line X, of the road contact surface of the block illustrated in FIG. 4. FIGS. 6 and 7 are cross-sectional views, taken along line P-P (FIG. 6) and line Q (FIG. 7), of the recess/protrusion portions illustrated in FIG. 4. FIGS. 4 and 5 illustrate the arrangement structure of recess/protrusion portions 6 on the road contact surface of the block 4, and FIGS. 6 and 7 illustrate cross-sectional shapes of the recess/protrusion portions 6 in the depth direction.

As illustrated in FIG. 3, the block 4 includes a plurality of the fine recess/protrusion portions 6 on the road contact surface.

The recess/protrusion portions 6 are fine surface processing portions formed on the road contact surface of the block 4. Specifically, the recess/protrusion portions 6 include fine recess portions such as narrow shallow grooves and fine dimples; and fine protrusion portions such as fine narrow ribs and fine projection portions. On the other hand, the recess/protrusion portions 6 do not include, for example, deep narrow grooves, sipes that close when the tire comes into contact with the ground, deep dimples, or notch portions. Note that conceptually, dimples having a long structure correspond to grooves and that projection portions having a long structure correspond to ribs.

In the configuration described above, because the road contact surface of the block 4 includes the densely-disposed, fine recess/protrusion portions 6, the grounding characteristics of the block 4 with respect to an icy road surface are improved, thus improving the performance on ice of the tire. Specifically, (1) in a configuration in which the recess/protrusion portions 6 are fine recess portions, the recess/protrusion portions 6 absorb and remove a water film on the icy road surface in icy road surface driving conditions. Accordingly, the adhesive properties (what is called adhesive friction force) of the road contact surface of the block 4 on the icy road surface are improved, thus improving the tire performance on ice at the start of using a new tire.

Additionally, (2) in a configuration in which the recess/protrusion portions 6 are fine protrusions, the recess/protrusion portions 6 wear out early to accelerate initial wear of the road contact surface of the block 4. Accordingly, the grounding characteristics of the tread rubber are appropriately displayed, thus improving the tire performance on ice at the start of using a new tire.

Additionally, the recess/protrusion height Hc (see FIGS. 6 and 7) of the recess/protrusion portions 6 is preferably in the range $0.1 \text{ mm} \leq Hc \leq 1.0 \text{ mm}$ and more preferably in the range $0.2 \text{ mm} \leq Hc \leq 0.6 \text{ mm}$. The lower limit and upper limit described above ensure the appropriate action of the fine recess/protrusion portions 6.

The recess/protrusion height Hc of the recess/protrusion portions is measured as a distance from the plane of the block road contact surface to the maximum depth position or the maximum height position of the outer surface of the recess/protrusion portions. Specifically, in a configuration in which the recess/protrusion portions are fine recess portions, the recess/protrusion height Hc is measured with reference to the maximum depth position of the recess/protrusion portions (see FIG. 6). Additionally, in a configuration in which the recess/protrusion portions include fine protrusion portions, the recess/protrusion height Hc is measured with reference to the maximum height position of the recess/protrusion portions (not illustrated).

Additionally, the width Wc (see FIGS. 4 and 6) of the recess/protrusion portions is preferably in the range $0.1 \text{ mm} \leq Wc \leq 0.8 \text{ mm}$ and more preferably in the range $0.2 \text{ mm} \leq Wc \leq 0.5 \text{ mm}$. The lower limit and upper limit described above properly ensure the action of the fine recess/protrusion portions 6.

The width Wc of the recess/protrusion portions is measured with reference to intersection points between the plane of the block road contact surface and the outer surface of the recess/protrusion portions. Specifically, in a configuration in which the recess/protrusion portions are fine recess portions, the width Wc is measured with reference to opening edges of the recess/protrusion portions relative to the plane of the block road contact surface (see FIG. 6). Additionally, in a configuration in which the recess/protrusion portions include fine protrusion portions, the width Wc is measured with reference to rising portions of the side walls of the recess/protrusion portions in the plane of the block road contact surface. If the aspect ratio of the recess/protrusion portions on the block road contact surface is not less than 1.50, that is, when the recess/protrusion portions have a long structure, the width Wc of the recess/protrusion portions is measured as the maximum width of the recess/protrusion portions in the direction orthogonal to the longitudinal direction of the recess/protrusion portions (see FIG. 4). Additionally, when the aspect ratio of the recess/protrusion portions is less than 1.50, the width Wc of the recess/protrusion portions is measured as the maximum outer diameter of the recess/protrusion portions.

For example, in the configuration of FIG. 3, the recess/protrusion portions 6 include narrow shallow grooves. Additionally, a plurality of narrow shallow grooves are densely disposed, and a band-like region A1 including a group of narrow shallow grooves is formed. Additionally, a plurality of the regions A1 are disposed side by side in the tire circumferential direction, with the longitudinal direction of the regions A1 aligned with the tire lateral direction. Additionally, a region A2 with no narrow shallow grooves is disposed between the adjacent regions A1, A1. Additionally, the regions A1 including a group of narrow shallow grooves and the regions A2 including no narrow shallow grooves are disposed alternately in a predetermined direction. Accordingly, a group of narrow shallow grooves is disposed in a striped pattern in the road contact surface of the block 4. These regions A1, A2 will be described below.

Additionally, in the configuration of FIG. 4, the narrow shallow grooves have a straight shape when the road contact surface of the block 4 is viewed planarly. However, no such limitation is intended, and the narrow shallow grooves may have an arcuate shape, a wave-like shape, or other curved shape or may have a V-shape, a zigzag shape, a stepped shape, or other bent shape (not illustrated).

Additionally, in the configuration of FIG. 4, the narrow shallow grooves generally have a constant width Wc and a constant depth Hc (see FIG. 6). However, no such limitation is intended, and the width Wc and the depth Hc of each of the recess/protrusion portions 6 may vary (not illustrated).

Additionally, the groove width Wc of the narrow shallow grooves preferably ranges from 0.1 mm to 0.8 mm and more preferably ranges from 0.3 mm to 0.6 mm. The lower limit described above ensures the water film removal action of the narrow shallow grooves. Additionally, the upper limit described above provides the appropriate rigidity of the ground contact region between adjacent narrow shallow grooves.

The arrangement interval P (see FIG. 4) of the narrow shallow grooves 7 preferably ranges from 0.1 mm to 1.0 mm and more preferably ranges from 0.2 mm to 0.5 mm. The lower limit described above ensures the water film removal action of the narrow shallow grooves. The upper limit described above provides the appropriate rigidity of the ground contact region between adjacent narrow shallow grooves. In particular, the narrow shallow grooves have the groove depth Hc smaller than that of the sipes 5, and thus remain open instead of closing in a case where the block 4 is in contact with the ground. Accordingly, the water film removal action of the narrow shallow grooves is ensured when the block 4 is in contact with the ground.

Additionally, in the configuration of FIG. 4, the longitudinal direction of the narrow shallow grooves is inclined with respect to the tire circumferential direction at a predetermined inclination angle (corresponding dimensional sign is omitted from the drawing). The inclination angle of the narrow shallow grooves preferably ranges from 20 degrees to 70 degrees and more preferably ranges from 30 degrees to 60 degrees. Accordingly, the appropriate water film removal action of the narrow shallow grooves is ensured. Note that the inclination angle of the narrow shallow grooves is measured as the angle between a straight line connecting the left and right end portions of one continuous narrow shallow groove and the tire circumferential direction.

Additionally, in the configuration of FIG. 4, a group of narrow shallow grooves that constitute the region A1 is arranged with a constant pitch (corresponding dimensional sign is omitted from the drawing). However, no such limitation is intended, and the pitch of the narrow shallow grooves may vary (not illustrated). Additionally, the pitch of the narrow shallow grooves preferably ranges from 0.5 mm to 2.0 mm and more preferably ranges from 0.7 mm to 1.4 mm. The lower limit described above provides the appropriate rigidity of the block 4. The upper limit described above provides the appropriate arrangement density of the narrow shallow grooves, thus ensuring the water film removal action of the narrow shallow grooves. Note that the pitch of the narrow shallow grooves can be calculated as the sum of the width Wc of each narrow shallow groove described below and the arrangement interval Dc of adjacent narrow shallow grooves.

Additionally, as illustrated in FIGS. 5 and 6, the narrow shallow grooves have an arcuate cross-sectional shape when viewed cross-sectionally in the groove width direction. However, no such limitation is intended, and the narrow shallow groove may have a rectangular cross-sectional shape (not illustrated). Additionally, the groove depth of the narrow shallow groove may decrease gradually at the terminating end portion of the narrow shallow groove (see FIG. 7) or may decrease stepwise (not illustrated).

Recess/Protrusion Region and Smooth Region

Here, a region where the arrangement interval Dc (see FIG. 6) between the adjacent recess/protrusion portions 6, 6 is in the range Dc≤1.2 mm is defined as the recess/protrusion region A1. In other words, the recess/protrusion region A1 is defined as an arrangement region of a group of the recess/protrusion portions 6 arranged densely at a small arrangement interval. Accordingly, the water film removal action of the recess/protrusion portions 6 in the recess/protrusion region A1 is appropriately ensured.

The arrangement interval Dc between the recess/protrusion portions is the distance between the adjacent recess/protrusion portions and is measured in any set of recess/protrusion portions adjacent to each other. Additionally, the arrangement interval Dc is measured with reference to the intersection points between the plane of the block road contact surface and the outer surface of the recess/protrusion portions (see FIG. 6).

Additionally, in the recess/protrusion region A1, the arrangement interval Dc between the recess/protrusion portions 6 and the width Wc of the recess/protrusion portions 6 preferably have the relationship 0.80≤Dc/Wc and more preferably have the relationship 1.50≤Dc/Wc. In other words, instead of being continuous with each other, the adjacent recess/protrusion portions 6, 6 preferably include a flat surface formed between the recess/protrusion portions 6, 6. This provides the appropriate ground contact area inside the recess/protrusion region A1, thus improving the grounding characteristics of the recess/protrusion region A1 itself. Note that the condition of the ratio Dc/We is subject to restrictions by the upper limit Dc≤1.2 mm of the arrangement interval Dc.

Additionally, the area ratio of the recess/protrusion portions 6 to the recess/protrusion region A1 preferably ranges from 20% to 45% and more preferably ranges from 25% to 40%. Accordingly, the water film removal action of the recess/protrusion portions 6 in the recess/protrusion region A1 is more appropriately ensured.

The area ratio of the recess/protrusion portions is calculated as the ratio between the sum of the areas occupied by the recess/protrusion portions and the area of the entire recess/protrusion region A1 in a plan view of the road contact surface of the block 4. For example, in a configuration in which the recess/protrusion portions 6 are recess portions, the ratio between the sum of opening areas and the area of the entire recess/protrusion region A1 is calculated as the area ratio of the recess/protrusion portions.

Additionally, a region other than the recess/protrusion region A1 described above and in which the arithmetic mean roughness Ra of the road contact surface of the block 4 is in the range Ra≤50 μm is defined as the smooth region A2. In other words, the smooth region A2 is defined as a flat region with no grooves, sipes, or fine recess/protrusion portions. The smooth region A2 is disposed so as to provide an appropriate contact area between the road contact surface of the block 4 and the road surface in tire ground contact conditions.

The arithmetic mean roughness Ra is measured in accordance with JIS (Japanese Industrial Standard) B0601.

The smooth region A2 may have a planar road contact surface that has not undergone surface processing or may have a road contact surface processed so as to be interspersed with a plurality of micro semi-spherical protrusions. In such surface processing, each of the micro protrusions has a maximum height ranging from 1 μm to 50 μm and has a maximum outer diameter ranging from 1 μm to 50 μm. Furthermore, the average interval between apexes of the adjacent micro protrusions preferably ranges from 5 μm to 100 μm. Additionally, the maximum height and maximum outer diameter of the micro protrusions are measured using, for example, a microscope with reference to intersection points between each of the micro protrusions and the plane of the block road contact surface.

Additionally, the road contact surface of the block 4 may include an intermediate region that corresponds to neither the recess/protrusion region A1 nor the smooth region A2 described above. Accordingly, the recess/protrusion region A1 and the smooth region A2 may be adjacent to each other (see FIG. 3) or may include an intermediate region A3 therebetween (not illustrated).

Specifically, the arrangement position (that is, the local arrangement region) of the recess/protrusion portions 6 having a recess/protrusion height Hc of less than 0.1 mm and more than 50 μm is included in neither the recess/protrusion region A1 nor the smooth region A2 described above (not illustrated). This arrangement position of the recess/protrusion portions 6 prevents the recess/protrusion portions 6 from performing the water film removal action on the recess/protrusion region A1 described above and also prevents the action of providing an appropriate contact area between the road contact surface of the block 4 and the road surface in the smooth region A2 described above.

Similarly, the recess/protrusion region A1 and the smooth region A2 described above fail to be provided by the arrangement position of the recess/protrusion portions 6 (for example, deep narrow grooves, notch portions, sipes, and the like) having a recess/protrusion height Hc of more than 1.0 mm or the width Wc of more than 0.8 mm. Such an arrangement position of the recess/protrusion portions 6 fails to provide the inherent functions of the recess/protrusion portions 6 in the initial stages of wear of the tire, and the recess/protrusion portions 6 remain until intermediate stages of wear.

Additionally, even in a configuration in which the recess/protrusion portions 6 have the predetermined recess/protrusion height Hc and width Wc described above, in a case where the recess/protrusion portions 6 have an arrangement interval Dc of more than 1.2 mm, that is, in a case where the recess/protrusion portions 6 are sparsely distributed, the recess/protrusion portions 6 fail to constitute the recess/protrusion region A1 described above. Each of the distributed recess/protrusion portions 6 fails to independently appropriately perform the water film removal action on the recess/protrusion region A1 described above.

Boundary lines of the recess/protrusion region A1 are drawn as follows (see FIG. 4). First, in a plan view of the block road contact surface, a flat surface with a width of more than 1.2 mm is selected. Then, recess/protrusion portions 6 are extracted that have the predetermined recess/protrusion height Hc and width Wc described above with respect to the flat surface, and furthermore, a group of the recess/protrusion portions 6 arranged densely at the predetermined arrangement interval Dc described above is selected. The outermost end portions and edge portions of the selected group of recess/protrusion portions 6 are connected together with straight line segments, and the set of these line segments is approximated by smooth straight lines or curved lines to draw boundary lines of the recess/protrusion region A1. Additionally, contour lines of other recess/protrusion portions (e.g. deep narrow grooves, notch portions, sipes, and the like) in the region are drawn and excluded from the recess/protrusion region A1.

Boundary lines of the smooth region A2 are drawn as follows (see FIG. 4). First, a region is extracted that corresponds to the block road contact surface from which the recess/protrusion region A1 has been excluded, and furthermore, a region is selected where the arithmetic mean roughness Ra of the block road contact surface is in the range Ra≤50 μm. Outer edges of the selected region are connected together with straight line segments, and the set of these line segments is approximated by smooth straight lines or curved lines to draw boundary lines of the smooth region A2. Additionally, other contours (e.g., deep narrow grooves, notch portions, sipes, etc.) in the region are drawn and excluded from the smooth region A2.

Additionally, a cross-section X perpendicular to the tire lateral direction is defined.

In this case, the recess/protrusion regions A1 and smooth regions A2 are disposed in a mixed manner in an optional cross-section X within a lateral range of not less than 40% (preferably not less than 50%) of the lateral length Wb of the road contact surface of the block 4. Accordingly, the recess/protrusion regions A1 and the smooth regions A2 are disposed in a mixed manner in a predetermined lateral range of the road contact surface of the block 4.

The lateral range may be continuous or discontinuous. Accordingly, in a case where the road contact surface of the block is scanned in the tire lateral direction, the cross-section X may satisfy the conditions described above within the lateral range of a total of not less than 40% of the lateral length Wb.

Additionally, in the optional cross-section X within the lateral range, a width W1 of the recess/protrusion region A1 is in the range 1.0 mm≤W1, and a width W2 of the smooth region A2 is preferably in the range 2.0 mm≤W2, more preferably, in the ranges 3.0 mm≤W1≤8.0 mm and 4.0 mm≤W2≤10.0 mm. Accordingly, the actions of the recess/protrusion region A1 and the smooth region A2 are effectively exerted.

The widths W1, W2 of the regions are measured on the cross-section X. Additionally, in a case where the recess/protrusion region A1 and the smooth region A2 include the intermediate region A3, the widths of the recess/protrusion region A1 and the smooth region A2 from which the width of the intermediate region A3 is subtracted are determined to be the widths W1, W2 of the regions A1, A2.

Additionally, in the configuration described above, the width W1 of the recess/protrusion region A1 and the width W2 of the smooth region A2 adjacent to the recess/protrusion region A1 preferably have the relationship 0.50≤W1/W2≤1.50 and more preferably have the relationship 0.70≤W1/W2≤1.20 (see FIG. 3). In other words, the widths W1, W2 of the recess/protrusion region A1 and the smooth region A2 adjacent to each other are preferably set to substantially the same value. Accordingly, the action of the mixed arrangement of the recess/protrusion region A1 and the smooth region A2 can be effectively exerted.

Additionally, the arrangement interval Dc between the recess/protrusion portions 6 in the recess/protrusion region A1 and the width W2 of the smooth region A2 preferably have the relationship 4.0≤W2/Dc and more preferably have the relationship 8.0≤W2/Dc (see FIG. 4). Accordingly, the action of the mixed arrangement of the recess/protrusion region A1 and the smooth region A2 can be appropriately exerted. The upper limit of the ratio W2/Dc is not particularly limited but is subject to restrictions by other conditions.

Additionally, a sum ΣW1 of the widths W1 of the recess/protrusion regions A1 and a length Lb' of the road contact surface of the block 4 in the cross-section X preferably have the relationship 0.20≤ΣW1/Lb' and more preferably have the relationship 0.40≤ΣW1/Lb'. Similarly, a sum ΣW2 of the widths W2 of the smooth regions A2 and the length Lb' of the road contact surface of the block 4 at the arrangement position of the smooth region A2 preferably have the relationship 0.20≤ΣW2/Lb' and more preferably have the relationship 0.40≤ to ΣW2/Lb'. This provides the appropriate total width of the recess/protrusion regions A1 and the smooth regions A2 in the predetermined circumferential direction range. The upper limit of the ratio ΣW1/Lb' and ΣW2/Lb' is not particularly limited but is subject to restrictions by other conditions.

The length Lb' is measured when the tire is mounted on a specified rim, inflated to the specified internal pressure, and in an unloaded state.

In the configuration described above, (1) since the road contact surface of the block 4 includes the recess/protrusion region A1 including the densely-disposed, fine recess/protrusion portions 6, the recess/protrusion region A1 absorbs and removes the water film from the icy road surface. Additionally, the flat smooth region A2 of the road contact surface of the block 4 provides the appropriate contact area of the block 4 on the icy road surface. The mixed arrangement of the recess/protrusion region A1 and the smooth region A2 improves the adhesive friction force of the smooth region A2 acting on the icy road surface. Accordingly, the grounding characteristics of the block 4 on the icy road surface are improved, thus synergistically improving the tire performance on ice.

In particular, (2) in vehicle braking and driving conditions, the road contact surface of the block 4 comes into contact with the icy road surface while sliding in the tire circumferential direction. In this case, due to the mixed arrangement of the recess/protrusion region A1 and the smooth region A2 in the tire circumferential direction (that is, on the cross-section X perpendicular to the tire lateral direction), the synergistic action of the recess/protrusion regions A1 and the smooth regions A2 improves the grounding characteristics of the block 4. Accordingly, tire braking performance on ice and tire driving performance on ice are efficiently improved.

For example, in the configuration of FIG. 3, the recess/protrusion region A1 and the smooth region A2 have a band-like structure that is long in the tire lateral direction. Additionally, the recess/protrusion region A1 and the smooth region A2 are shaped like rectangles with the given widths W1, W2. Additionally, the recess/protrusion regions A1 and the smooth regions A2 continuously extend from one end portion to the other end portion of the road contact surface of the block 4 in the tire lateral direction and traverse the road contact surface of the block 4 in the tire lateral direction.

In FIG. 3, an angle θ between the tire lateral direction and the longitudinal center line of the long recess/protrusion region A1, which is long in the tire lateral direction, is preferably in the range −15 degrees≤θ≤15 degrees and more preferably in the range −10 degrees≤θ≤10 degrees. Accordingly, the angle θ in the longitudinal direction of the recess/protrusion region A1 is appropriately set to appropriately ensure the functions of the recess/protrusion region A1.

Additionally, in the configuration of FIG. 3, the plurality of recess/protrusion regions A1 are disposed side by side in the tire circumferential direction. Additionally, the adjacent recess/protrusion regions A1, A1 are separated from each other. Additionally, the smooth region A2 is disposed between the adjacent recess/protrusion regions A1, A1. Additionally, the road contact surface of the block 4 includes four recess/protrusion regions A1 and three smooth regions A2, and the recess/protrusion regions A1 and smooth regions A2 are alternately disposed in the tire circumferential direction. Additionally, the recess/protrusion regions A1 are disposed at the left and right edge portions of the road contact surface of the block 4 in the tire circumferential direction. Additionally, the plurality of recess/protrusion regions A1 have the given width W1, and the smooth region A2 disposed between the adjacent recess/protrusion regions A1, A1 has the given width W2.

In the configuration described above, since the smooth region A2 is disposed between the adjacent recess/protrusion regions A1, A1, the adjacent recess/protrusion regions A1, A1 absorb the water film from the icy road surface in front of and behind or on the left and right of the smooth region A2. Accordingly, the adhesive friction force of the smooth region A2 acting on the icy road surface is improved, thus further improving the tire performance on ice. Furthermore, the three or more recess/protrusion regions A1 are arranged with the smooth region A2 interposed between the regions A1 so as to form a striped pattern, thus further improving the adhesive friction force of the smooth region A2 acting on the icy road surface.

Modified Examples

FIGS. 8 to 23 are explanatory diagrams illustrating modified examples of the block road contact surface illustrated in FIG. 3. In these drawings, components that are the same as the components illustrated in FIG. 1 have the same reference signs, and descriptions of the components are omitted.

For example, in the configuration of FIG. 3, as described above, the recess/protrusion region A1 and the smooth region A2 have a band-like structure that is long in the tire lateral direction. Additionally, the recess/protrusion regions A1 and the smooth regions A2 continuously extend from one end portion to the other end portion of the road contact surface of the block 4 in the tire lateral direction and traverse the road contact surface of the block 4 in the tire lateral direction.

Figure 8:
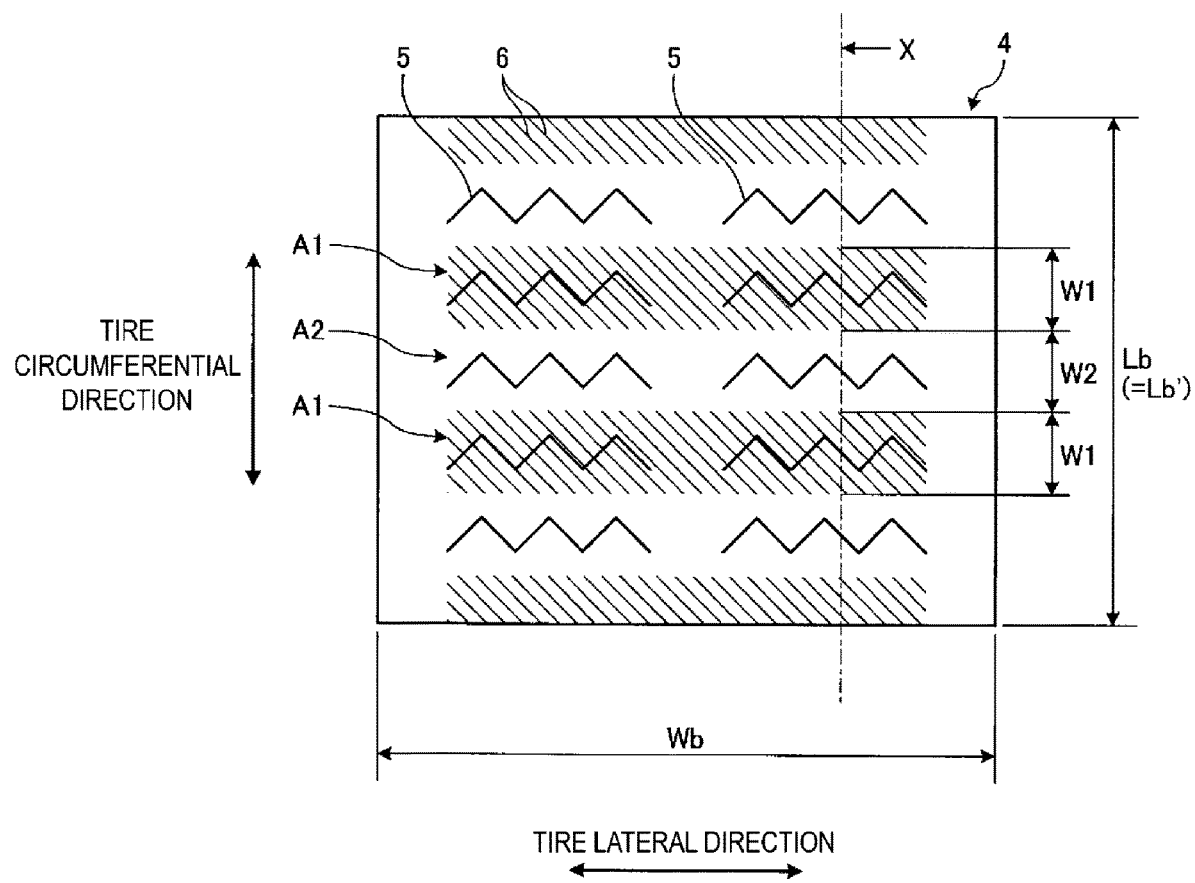
FIG. 8 is an explanatory diagram illustrating a modified example of the road contact surface of the block illustrated in FIG. 3.

In contrast, in the configuration of FIG. 8, the recess/protrusion region A1 is shorter than the lateral length Wb of the road contact surface of the block 4, is disposed in the central portion of the road contact surface of the block 4, and extends in the tire lateral direction. Additionally, both end portions of the recess/protrusion region A1 in the tire lateral direction terminate inside the road contact surface of the block 4. Additionally, the smooth region A2 extends along front and rear edge portions of the road contact surface of the block 4 in the tire lateral direction. In this way, the recess/protrusion region A1 need not traverse the road contact surface of the block 4 in the tire lateral direction. Additionally, the adjacent smooth regions A2, A2 may be continuous with each other.

Figure 9:
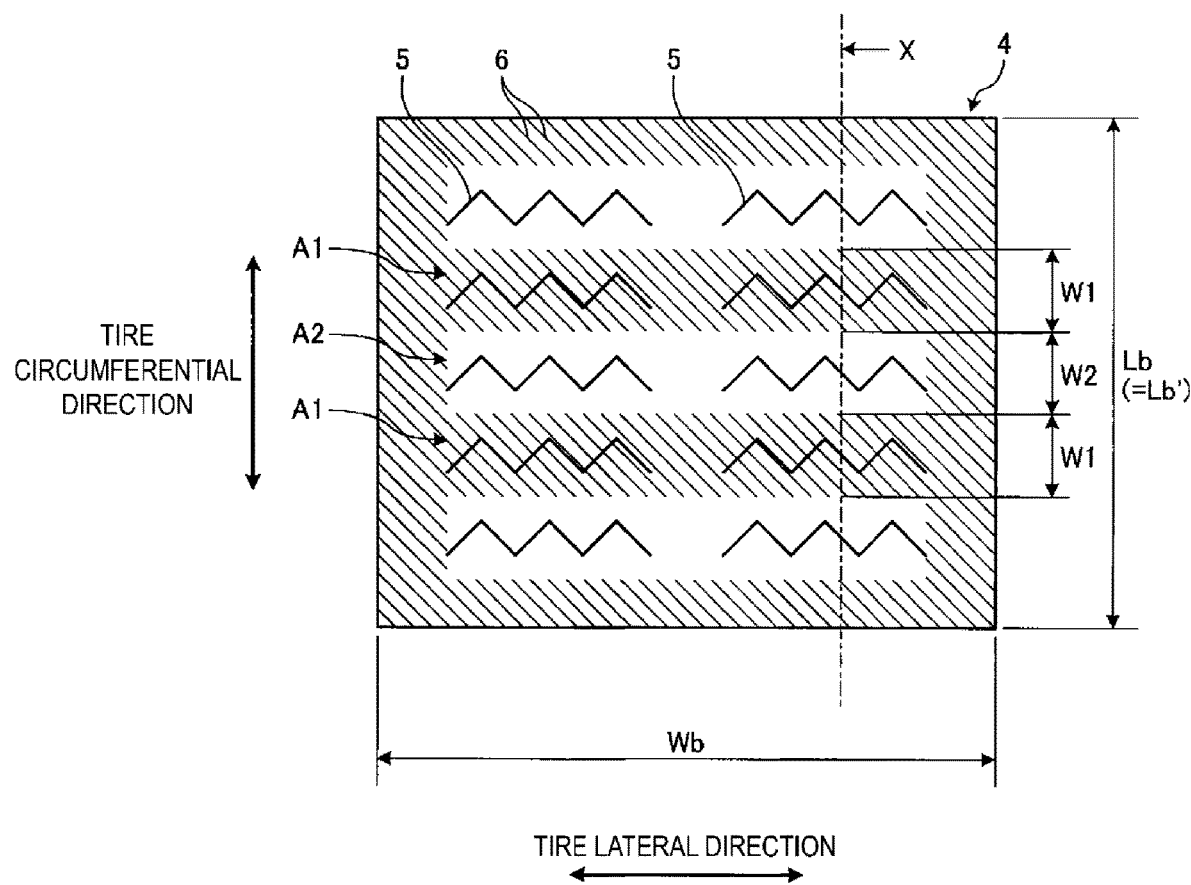
FIG. 9 is an explanatory diagram illustrating a modified example of the road contact surface of the block illustrated in FIG. 3.

On the other hand, in the configuration of FIG. 9, the smooth region A2 is shorter than the lateral length Wb of the road contact surface of the block 4, is disposed in the central portion of the road contact surface of the block 4, and extends in the tire lateral direction. Additionally, both end portions of the smooth region A2 in the tire lateral direction terminate inside the road contact surface of the block 4. Additionally, the recess/protrusion regions A1 extend along the front and rear edge portions of the road contact surface of the block 4 in the tire lateral direction. In this way, the smooth region A2 need not traverse the road contact surface of the block 4 in the tire lateral direction. Additionally, the adjacent recess/protrusion regions A1, A1 may be continuous with each other.

Figure 10:
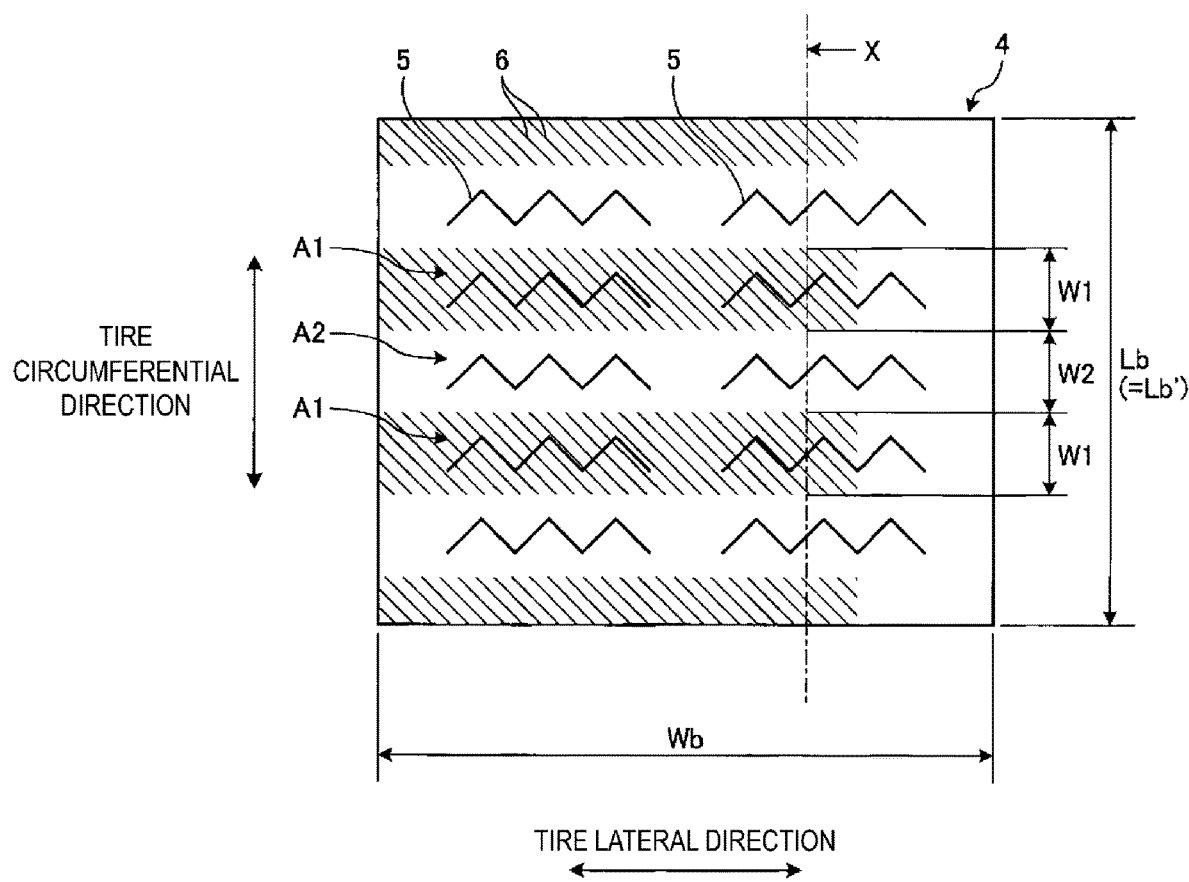
FIG. 10 is an explanatory diagram illustrating a modified example of the road contact surface of the block illustrated in FIG. 3.

Additionally, in the configuration of FIG. 10, the recess/protrusion region A1 is shorter than the lateral length Wb of the road contact surface of the block 4 and is unevenly disposed in the tire lateral direction on the road contact surface of the block 4. Additionally, one end portion of the recess/protrusion region A1 in the tire lateral direction terminates at one edge portion of the road contact surface of the block 4 in the tire lateral direction, and the other end portion of the recess/protrusion region A1 in the tire lateral direction terminates inside the road contact surface of the block 4. Additionally, the smooth region A2 extends along the other edge portion of the road contact surface of the block 4 in the tire lateral direction.

Figure 11:
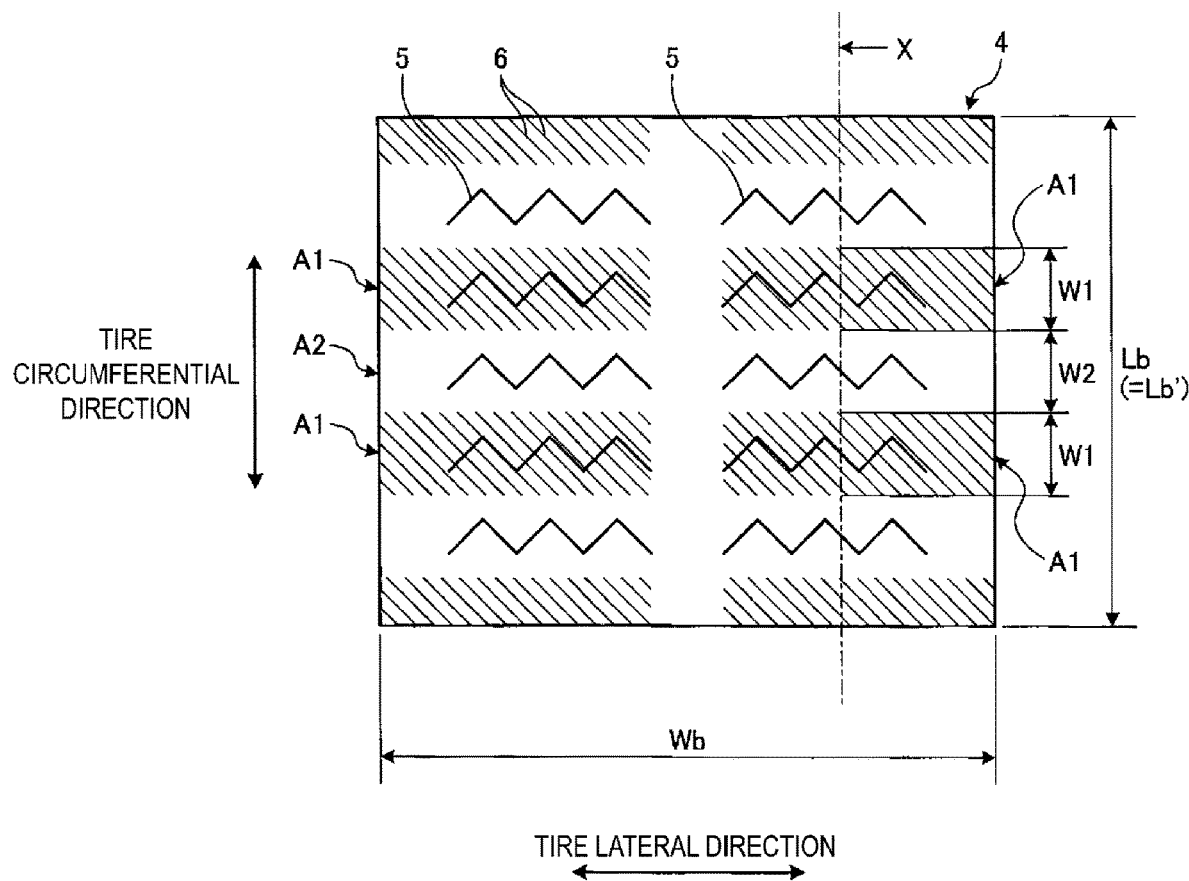
FIG. 11 is an explanatory diagram illustrating a modified example of the road contact surface of the block illustrated in FIG. 3.

Additionally, in the configuration of FIG. 11, in the configuration illustrated in FIG. 3, the recess/protrusion regions A1 are divided in the tire lateral direction at the central portion of the road contact surface of the block 4. In other words, a pair of the short recess/protrusion regions A1, A1 are disposed so as to lie opposite and away from each other in the tire lateral direction. Additionally, one of the recess/protrusion regions A1 extends from the interior of the road contact surface of the block 4 to one edge portion in the tire lateral direction, and the other recess/protrusion region A1 extends from the interior of the road contact surface of the block 4 to the other edge portion in the tire lateral direction. Additionally, a plurality of sets of the recess/protrusion regions A1, A1 are disposed in the tire circumferential direction at predetermined intervals. Additionally, the adjacent smooth regions A2, A2 are continuous with each other at the central portion of the block 4. Note that in the configuration of FIG. 11, a circumferential narrow groove may be formed in the central portion of the road contact surface of the block 4, more specifically, between the left and right recess/protrusion regions A1 (not illustrated). Such a circumferential narrow groove makes the ground contact pressure of the road contact surface of the block 4 uniform.

Figure 12:
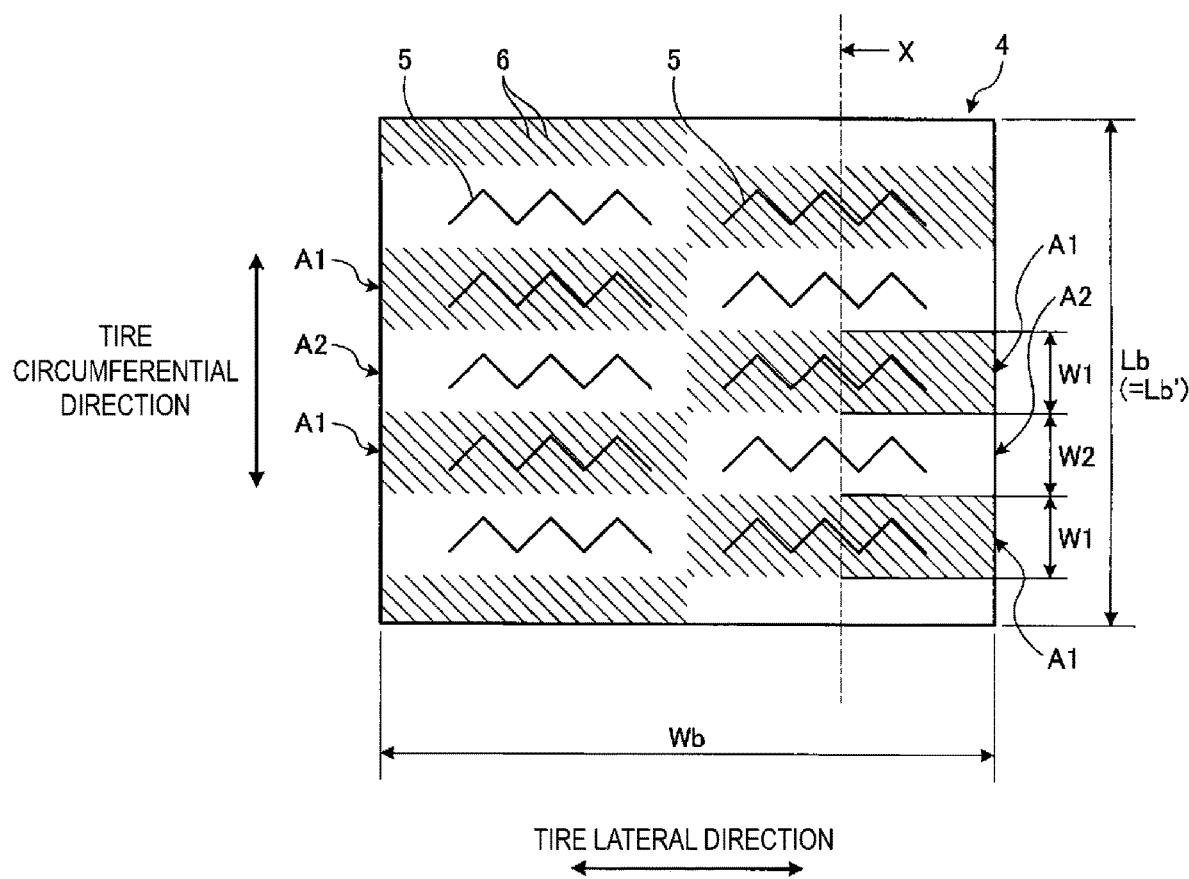
FIG. 12 is an explanatory diagram illustrating a modified example of the road contact surface of the block illustrated in FIG. 3.

Additionally, in the configuration of FIG. 12, a plurality of the short recess/protrusion regions A1 are disposed in a staggered manner in the tire circumferential direction. Additionally, one end portion of the recess/protrusion regions A1 in the tire lateral direction terminates at an edge portion of the road contact surface of the block 4 on one side in the tire lateral direction, and the other end portion of the recess/protrusion regions A1 in the tire lateral direction terminates inside the road contact surface of the block 4. Similarly, a plurality of the short smooth regions A2 are disposed in a staggered manner in the tire circumferential direction. Additionally, one end portion of the smooth regions A2 in the tire lateral direction terminates at an edge portion of the road contact surface of the block 4 on one side in the tire lateral direction, and the other end portion of the smooth regions A2 in the tire lateral direction terminates inside the road contact surface of the block 4. Additionally, in the configuration of FIG. 12, the adjacent recess/protrusion regions A1, A1 are arranged in a staggered manner in the tire circumferential direction with corner portions of the recess/protrusion regions A1, A1 abutting each other, the recess/protrusion regions A1, A1 not lapping over each other in the tire circumferential direction or the tire lateral direction. However, no such limitation is intended, and the adjacent recess/protrusion regions A1, A1 may be arranged in a staggered manner while lapping over each other in the tire circumferential direction or the tire lateral direction or in a staggered manner while lying away from each other in the tire circumferential direction or the tire lateral direction (not illustrated).

Figure 13:
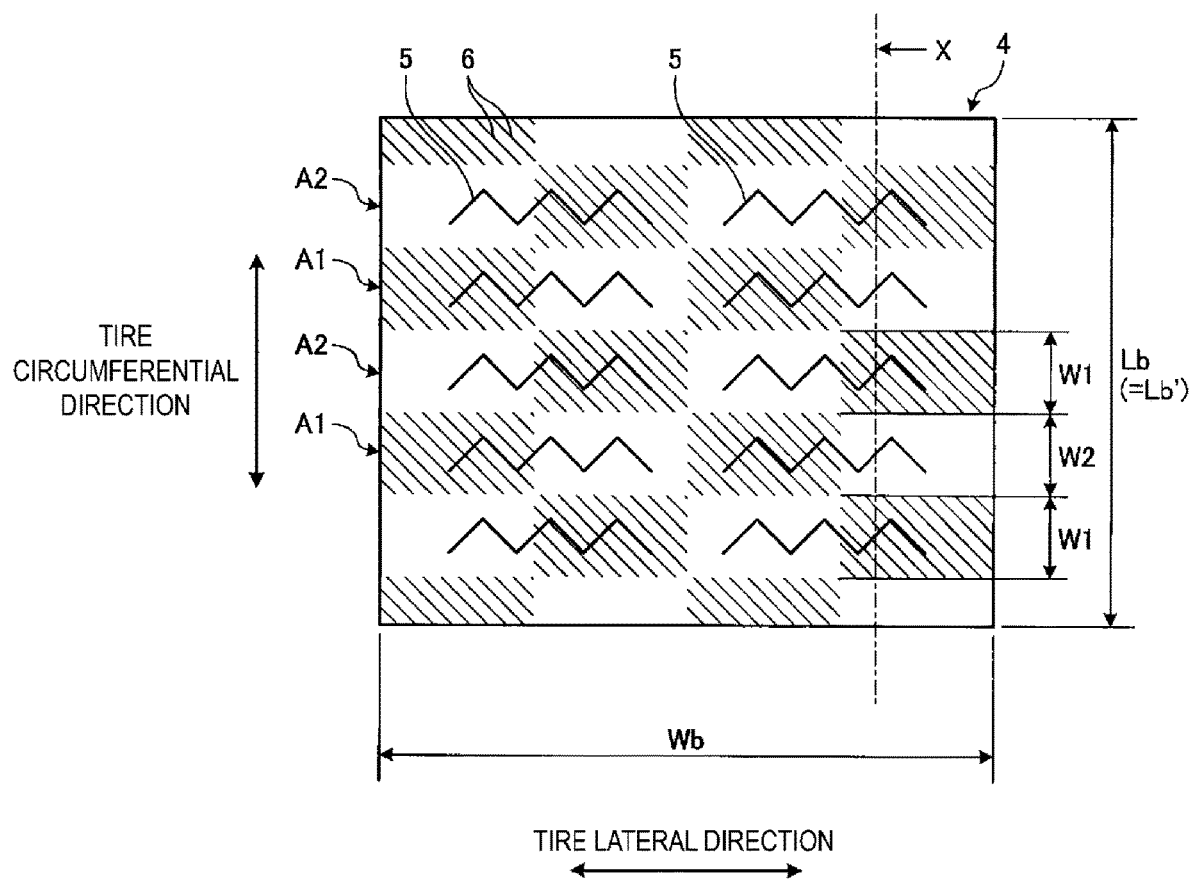
FIG. 13 is an explanatory diagram illustrating a modified example of the road contact surface of the block illustrated in FIG. 3.

Additionally, in the configuration of FIG. 13, a plurality of the short recess/protrusion regions A1 are arranged in a checkered pattern. Additionally, some of the recess/protrusion regions A1 extend to the edge portions of the road contact surface of the block 4 in the tire lateral direction. Similarly, a plurality of the short smooth regions A2 are arranged in a checkered pattern. Additionally, some of the smooth regions A2 extend to the edge portions of the road contact surface of the block 4 in the tire lateral direction. Additionally, some of the smooth regions A2 are disposed at the edge portions of the road contact surface of the block 4 in the tire circumferential direction. Note that in the configuration of FIG. 13, the number of checkered arrays including the recess/protrusion regions A1 and the smooth regions A2 is four in the tire lateral direction and six in the tire circumferential direction but that no such limitation is intended and that the number of checkered arrays may be three or five or more in the tire circumferential direction or three to five or seven or more in the tire circumferential direction. In this manner, the number of checkered arrays is not particularly limited but is subject to restrictions by other conditions.

Additionally, in the configuration of FIG. 8, the plurality of the short recess/protrusion regions A1 having the same lateral length are disposed side by side in the tire circumferential direction while aligning in the tire lateral direction. Similarly, in the configuration of FIG. 9, the plurality of the short smooth regions A2 having the same lateral length are disposed side by side in the tire circumferential direction while aligning in the tire lateral direction.

Figure 14:
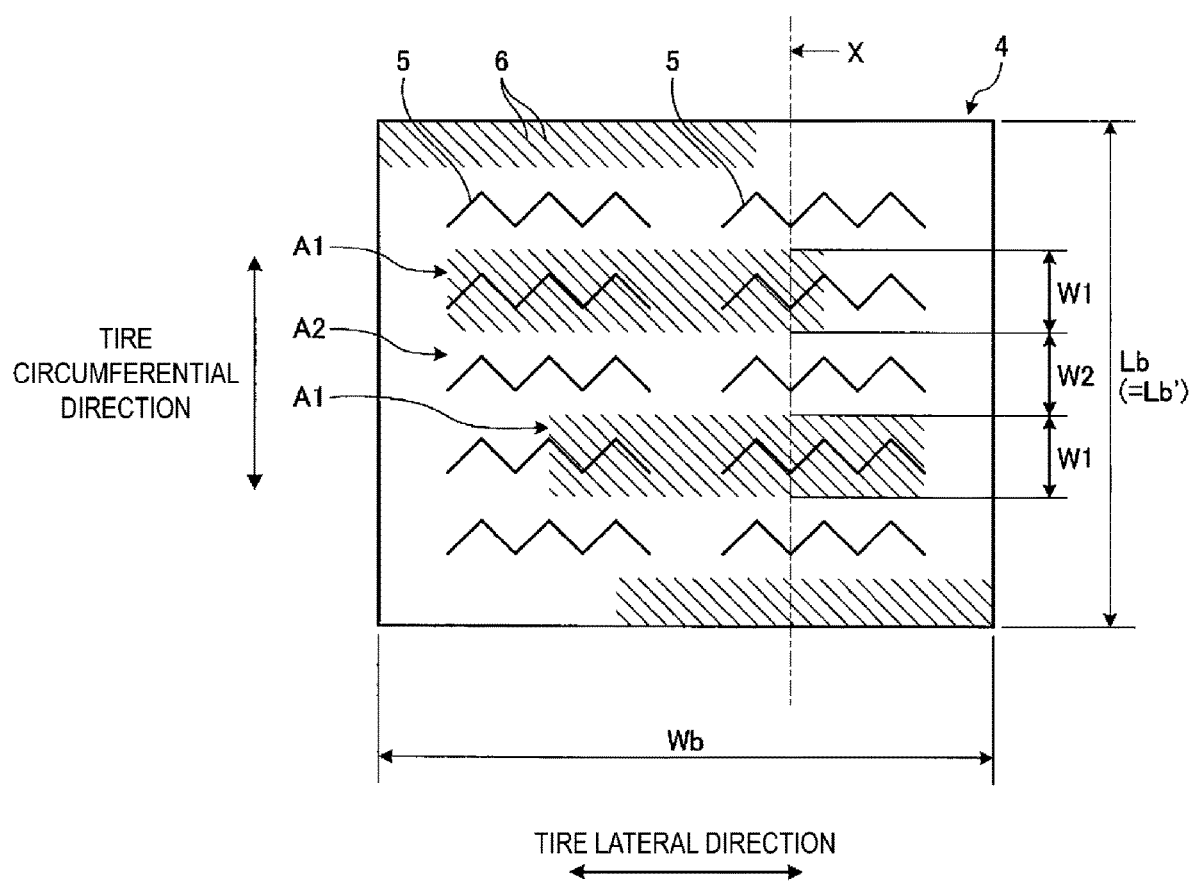
FIG. 14 is an explanatory diagram illustrating a modified example of the road contact surface of the block illustrated in FIG. 3.
Figure 15:
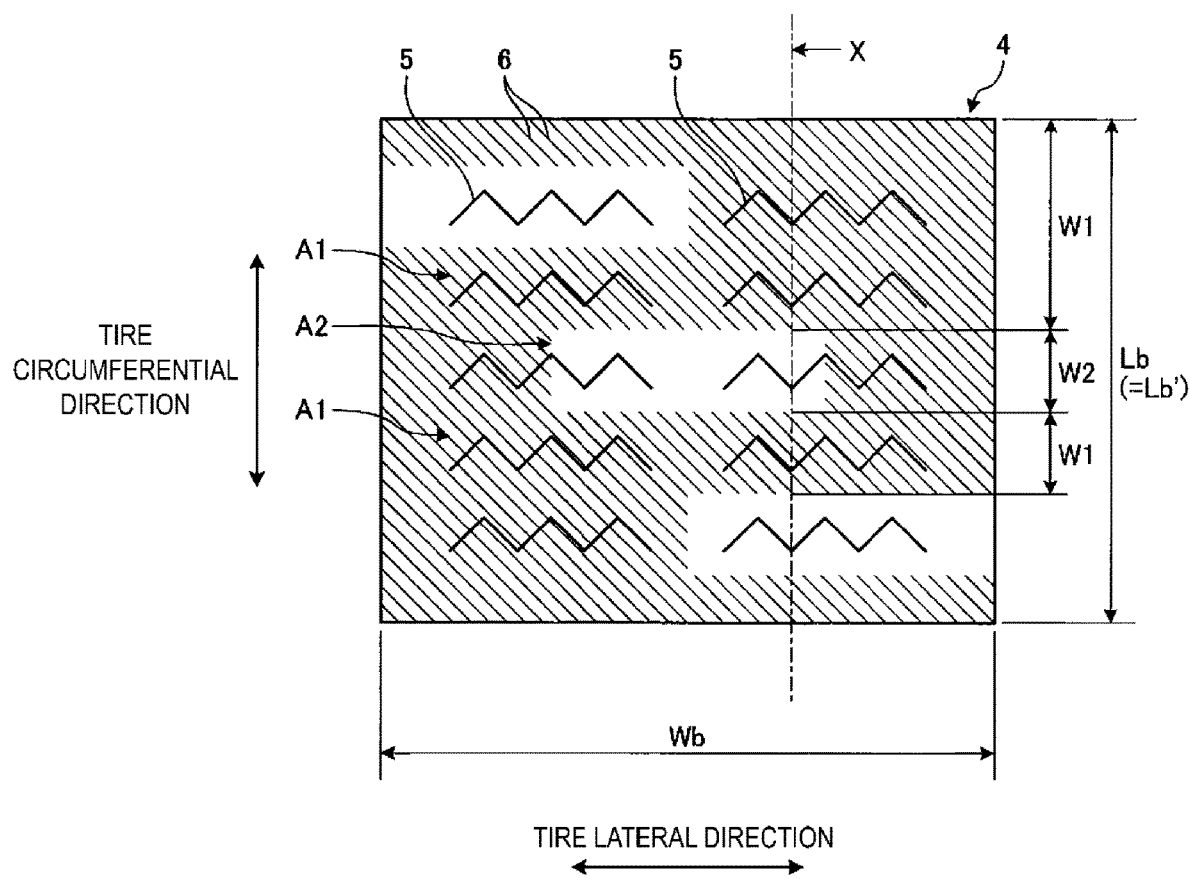
FIG. 15 is an explanatory diagram illustrating a modified example of the road contact surface of the block illustrated in FIG. 3.

However, no such limitation is intended, and as illustrated in FIG. 14, a plurality of the short recess/protrusion regions A1 having the same lateral length may be disposed side by side in the tire circumferential direction while being offset from one another in the tire lateral direction. Similarly, as illustrated in FIG. 15, a plurality of the short smooth regions A2 having the same lateral length may be disposed side by side in the tire circumferential direction while being offset from one another in the tire lateral direction.

Additionally, in the configurations of FIGS. 3 and 8, the plurality of recess/protrusion regions A1 having the same lateral length are disposed side by side in the tire circumferential direction. Similarly, in the configuration of FIGS. 3 and 9, the plurality of smooth regions A2 having the same lateral length are disposed side by side in the tire circumferential direction.

Figure 16:
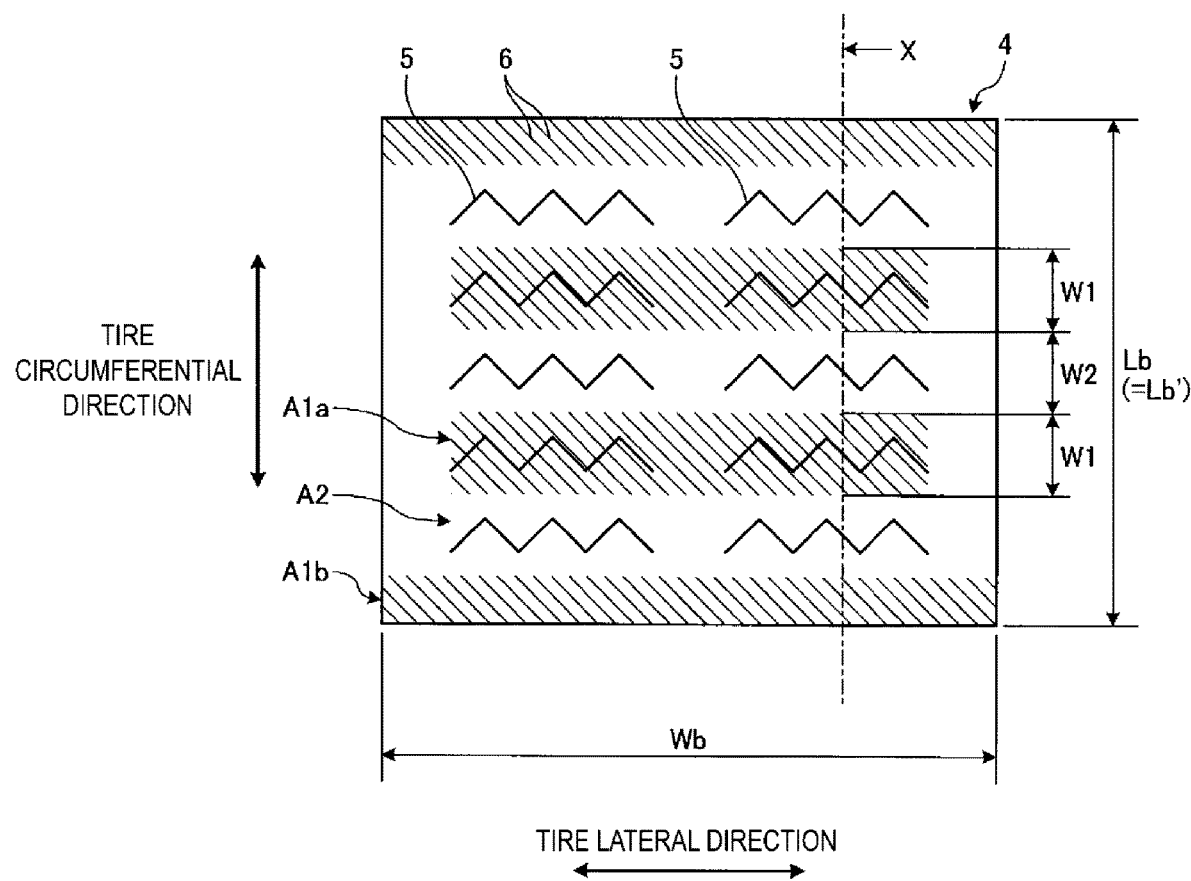
FIG. 16 is an explanatory diagram illustrating a modified example of the road contact surface of the block illustrated in FIG. 3.

However, no such limitation is intended, and as illustrated in FIG. 16, a plurality of recess/protrusion regions A1a, A1b having different lateral lengths may be disposed side by side in the tire circumferential direction. For example, in the configuration of FIG. 16, the short recess/protrusion regions A1a are disposed in a central portion region of the block 4 in the tire circumferential direction, and the long recess/protrusion regions A1b are disposed in end portion regions of the block 4 in the tire circumferential direction. Additionally, no such limitation is intended, the long recess/protrusion regions A1b may be disposed in the central portion region of the block 4 in the tire circumferential direction, and the short recess/protrusion regions A1a may be disposed in the end portion regions of the block 4 in the tire circumferential direction (not illustrated). Additionally, three or more recess/protrusion regions A1 may be disposed on the road contact surface of the block 4, and the lateral length of each of the recess/protrusion regions A1 may gradually decrease or increase from one direction toward the other direction in the tire circumferential direction of the block 4 (not illustrated).

Figure 17:
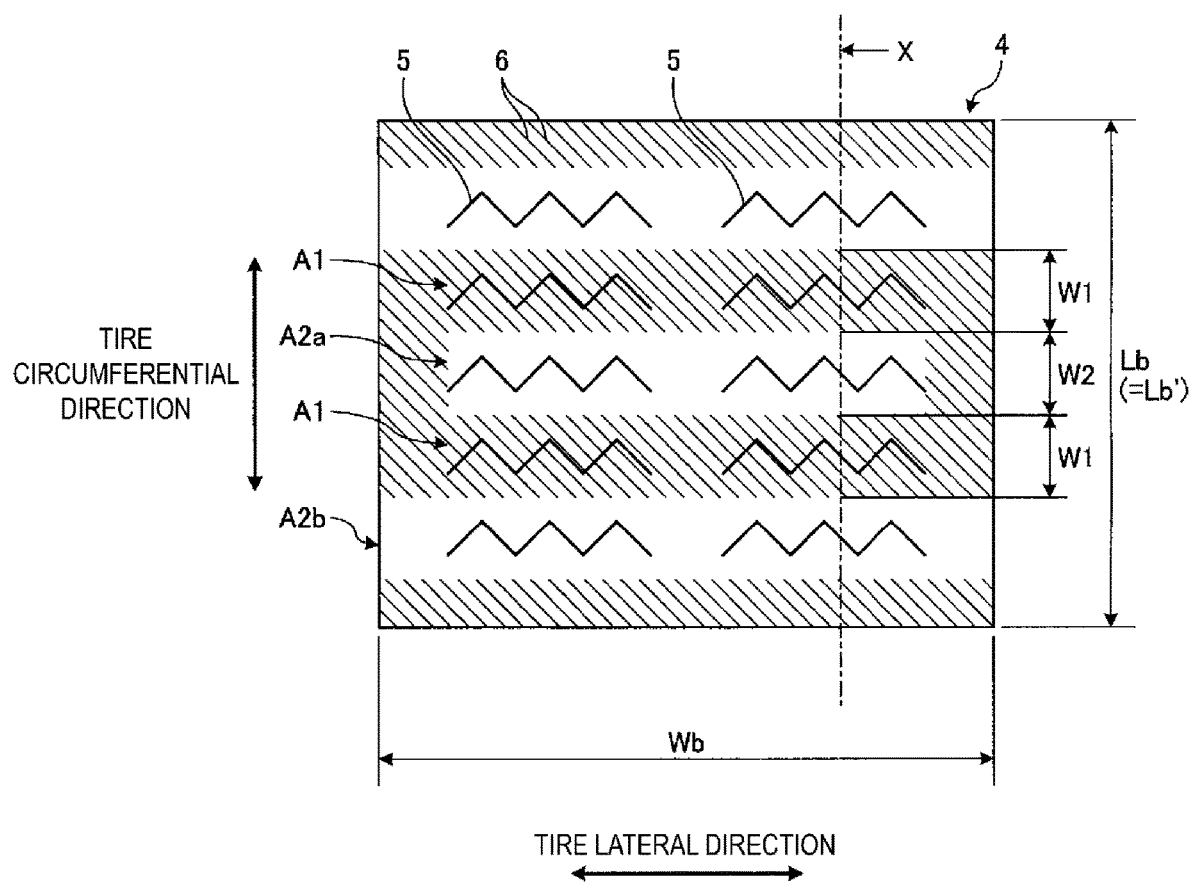
FIG. 17 is an explanatory diagram illustrating a modified example of the road contact surface of the block illustrated in FIG. 3.

Similarly, as illustrated in FIG. 17, a plurality of smooth regions A2a, A2b having different lateral lengths may be disposed side by side in the tire circumferential direction. For example, in the configuration of FIG. 17, the short smooth region A2a is disposed in the central portion region of the block 4 in the tire circumferential direction, and the long smooth regions A2b are disposed in the end portion regions of the block 4 in the tire circumferential direction. Additionally, no such limitation is intended, and the long smooth region A2b may be disposed in the central portion region of the block 4 in the tire circumferential direction, and the short smooth regions A2a may be disposed in the end portion regions of the block 4 in the tire circumferential direction (not illustrated). Additionally, three or more recess/protrusion regions A1 may be disposed on the road contact surface of the blocks 4, and the lateral length of each of the smooth regions A2 may gradually decrease or increase from one direction toward the other direction in the tire circumferential direction of the block 4 (not illustrated).

Additionally, in the configuration of FIG. 3, the plurality of recess/protrusion regions A1 having the same width W1 are disposed side by side in the tire circumferential direction. Additionally, the smooth regions A2 having the same width W2 are each disposed between the adjacent recess/protrusion regions A1, A1.

Figure 18:
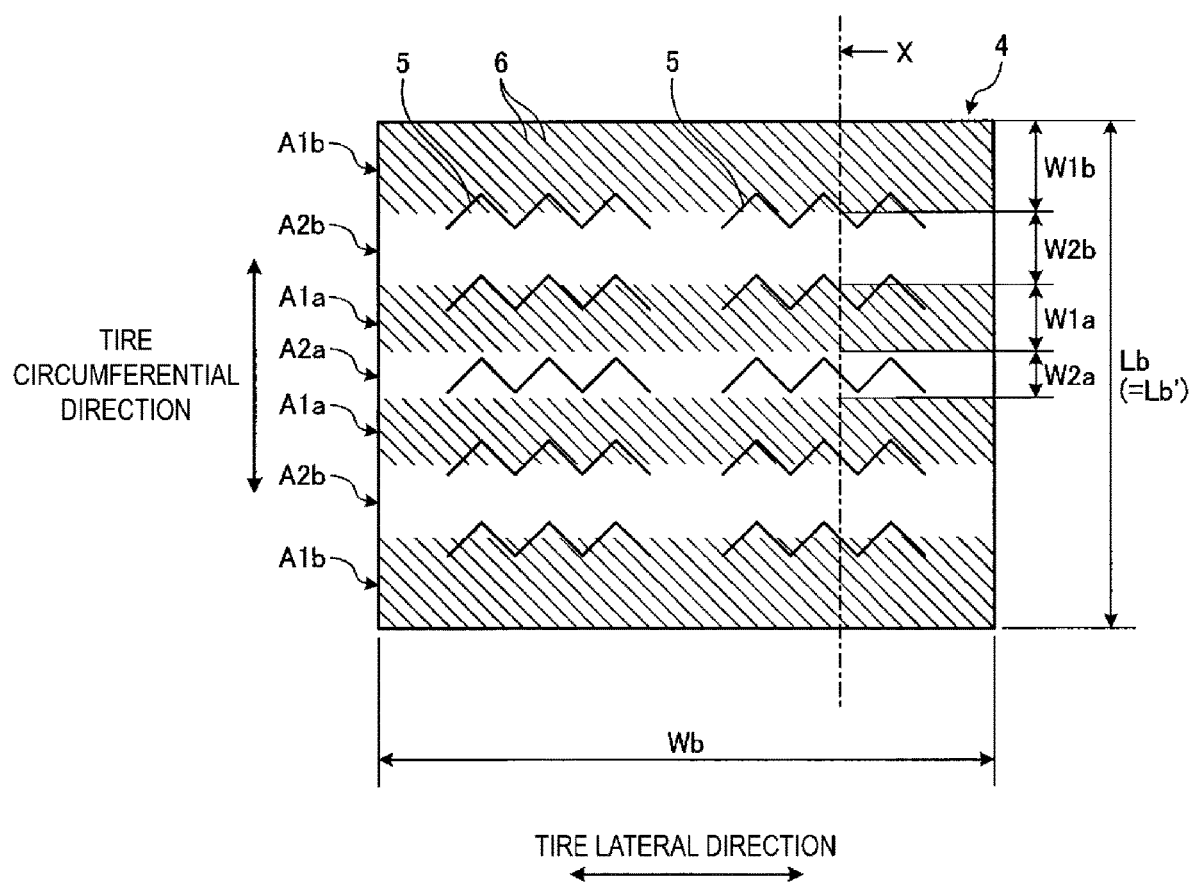
FIG. 18 is an explanatory diagram illustrating a modified example of the road contact surface of the block illustrated in FIG. 3.
Figure 19:
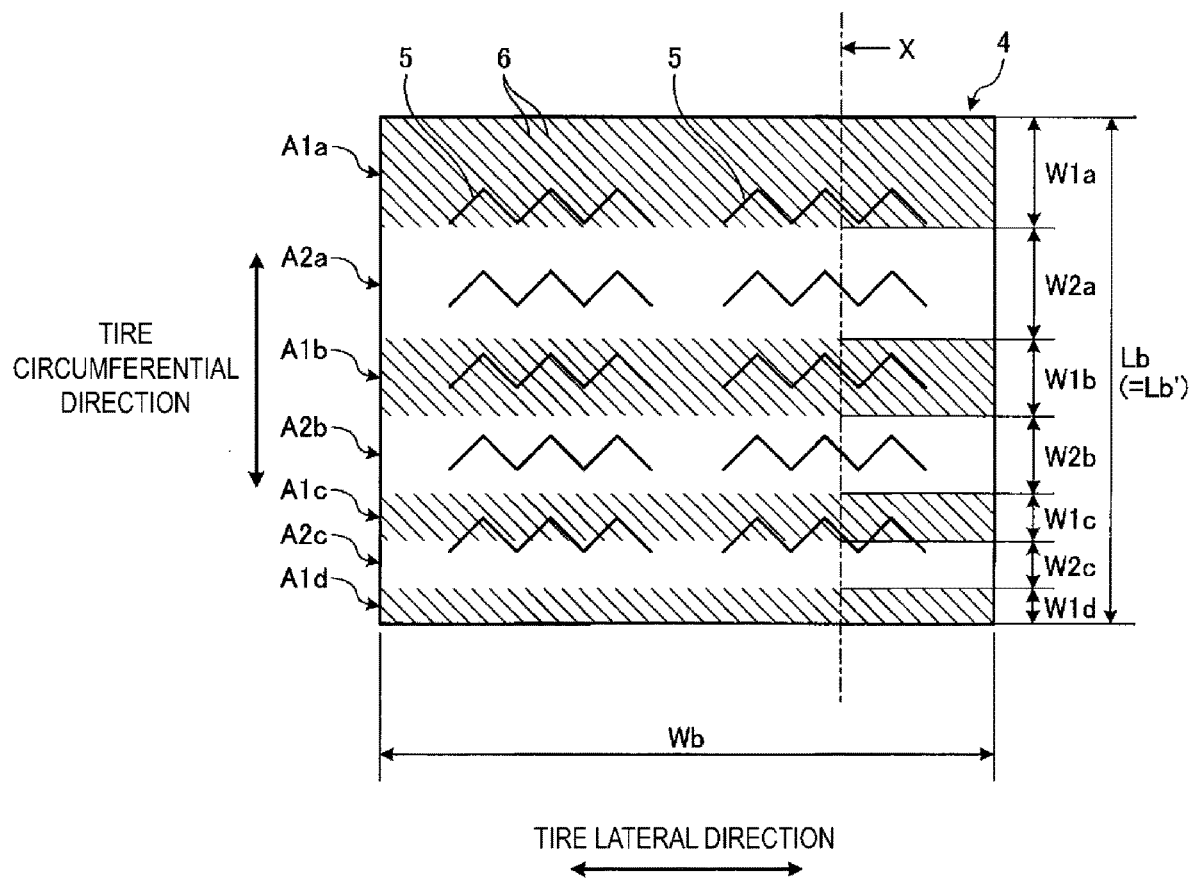
FIG. 19 is an explanatory diagram illustrating a modified example of the road contact surface of the block illustrated in FIG. 3.

However, no such limitation is intended, and as illustrated in FIGS. 18 and 19, a plurality of the recess/protrusion regions A1 having the different widths W1 may be disposed side by side in the tire circumferential direction. Additionally, the smooth regions A2 having the different widths W2 may each be disposed between the adjacent recess/protrusion regions A1, A1.

For example, in the configuration of FIG. 18, the recess/protrusion regions A1a with a small width W1a are disposed in the central portion region of the block 4 in the tire circumferential direction, and the recess/protrusion regions A1b with a large width W1b are disposed in the end portion regions of the block 4 in the tire circumferential direction. Additionally, looking at the smooth regions A2a, A2b disposed between the adjacent recess/protrusion regions A1a, A1a and A1a, A1b, the smooth region A2a with a small width W2a is disposed in the central portion region of the block 4 in the tire circumferential direction, and the smooth regions A2b with a large width W2b are disposed in the end portion regions of the block 4 in the tire circumferential direction. However, no such limitation is intended, and the wide recess/protrusion region A1 may be disposed in the central portion region of the block 4 in the tire circumferential direction, and the narrower recess/protrusion regions A1 may be disposed in the end portion regions of the block 4 in the tire circumferential direction (not illustrated). Additionally, for the smooth regions A2 disposed between the adjacent recess/protrusion regions A1, A1, the wide smooth region A2 may be disposed in the central portion region of the block 4 in the tire circumferential direction, and the narrow smooth regions A2 may be disposed in the end portion regions of the block 4 in the tire circumferential direction (not illustrated).

Additionally, as illustrated in FIG. 19, three or more recess/protrusion regions A1a to A1d may be disposed on the road contact surface of the block 4, and each of the widths W1a to W1d of the recess/protrusion regions A1a to A1d may gradually decrease or increase from one direction toward the other direction in the tire circumferential direction of the block 4. Additionally, three or more smooth regions A2a to A2c may each be disposed between the adjacent recess/protrusion regions A1a to A1d, and each of the widths W2a to W2c of the smooth regions A2a to A2c may gradually decrease or increase from one direction toward the other direction in the tire circumferential direction of the block 4.

Additionally, in the configuration of FIG. 3, as described above, the recess/protrusion regions A1 are disposed at the left and right edge portions of the road contact surface of the block 4 in the tire circumferential direction.

Figure 20:
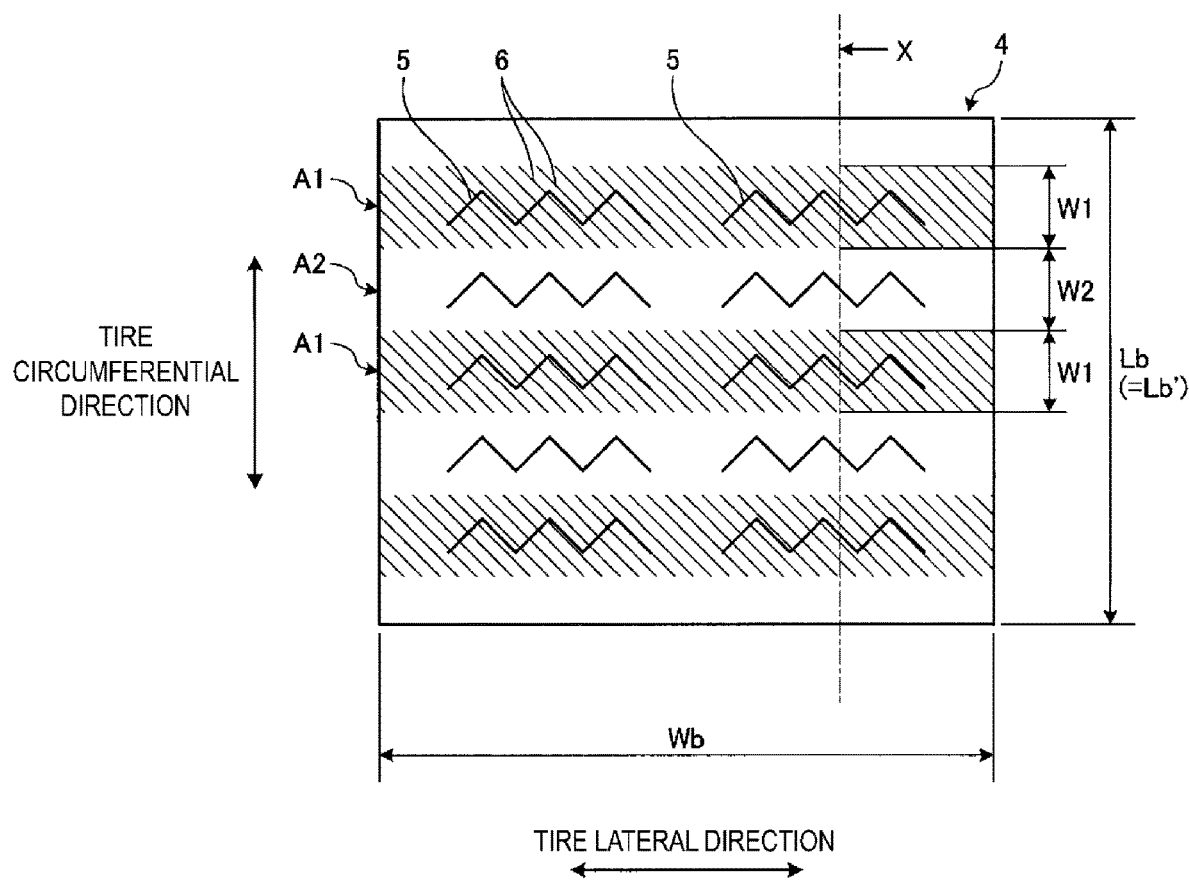
FIG. 20 is an explanatory diagram illustrating a modified example of the road contact surface of the block illustrated in FIG. 3.

However, no such limitation is intended, and as illustrated in FIG. 20, the smooth regions A2 may be disposed at the left and right edge portions of the road contact surface of the block 4 in the tire circumferential direction. Additionally, the recess/protrusion region A1 may be disposed at one edge portion of the road contact surface of the block 4 in the tire circumferential direction, and the smooth region A2 may be disposed at the other edge portion (not illustrated).

Additionally, in the configuration of FIG. 3, the four recess/protrusion regions A1 are arranged alternately with the smooth regions A2 all over the road contact surface of the block 4 in the tire circumferential direction, with each smooth region A2 interposed between the recess/protrusion regions A1.

Figure 21:
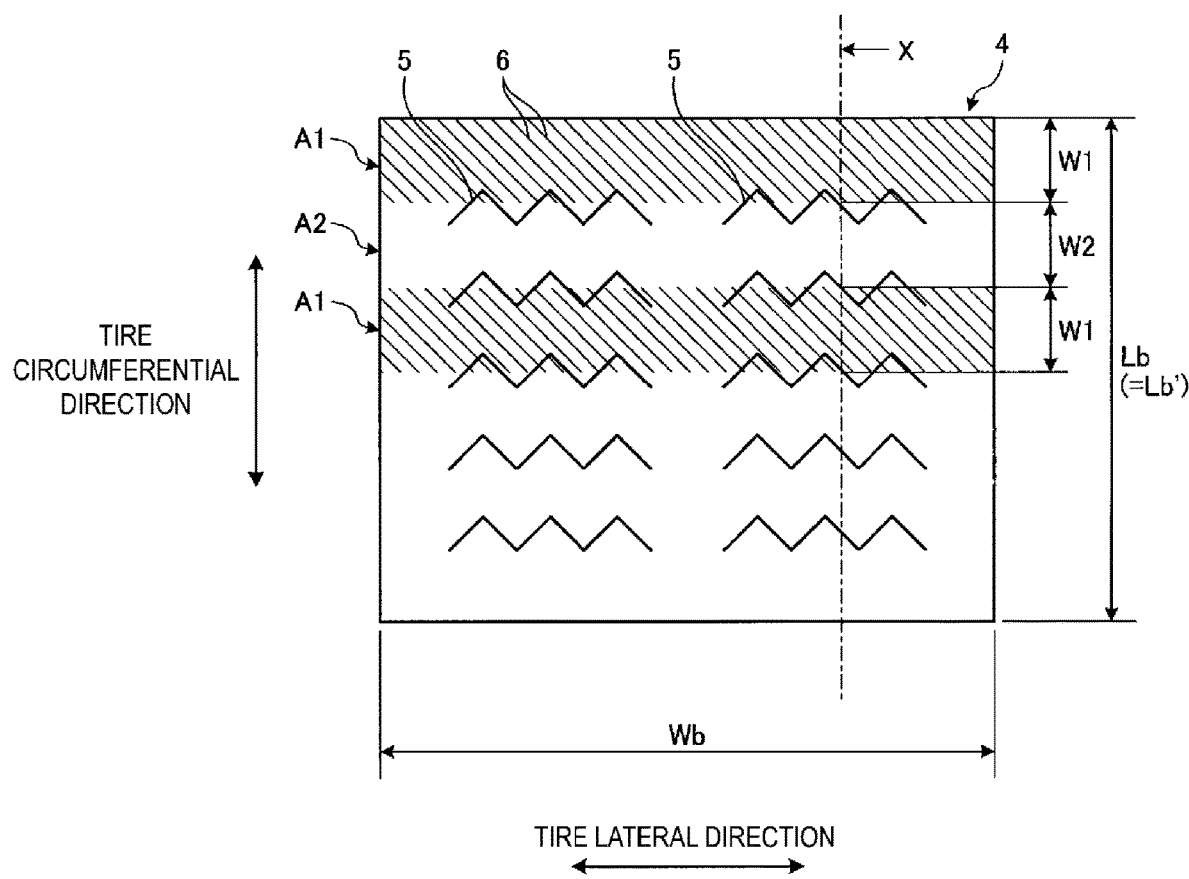
FIG. 21 is an explanatory diagram illustrating a modified example of the road contact surface of the block illustrated in FIG. 3.
Figure 22:
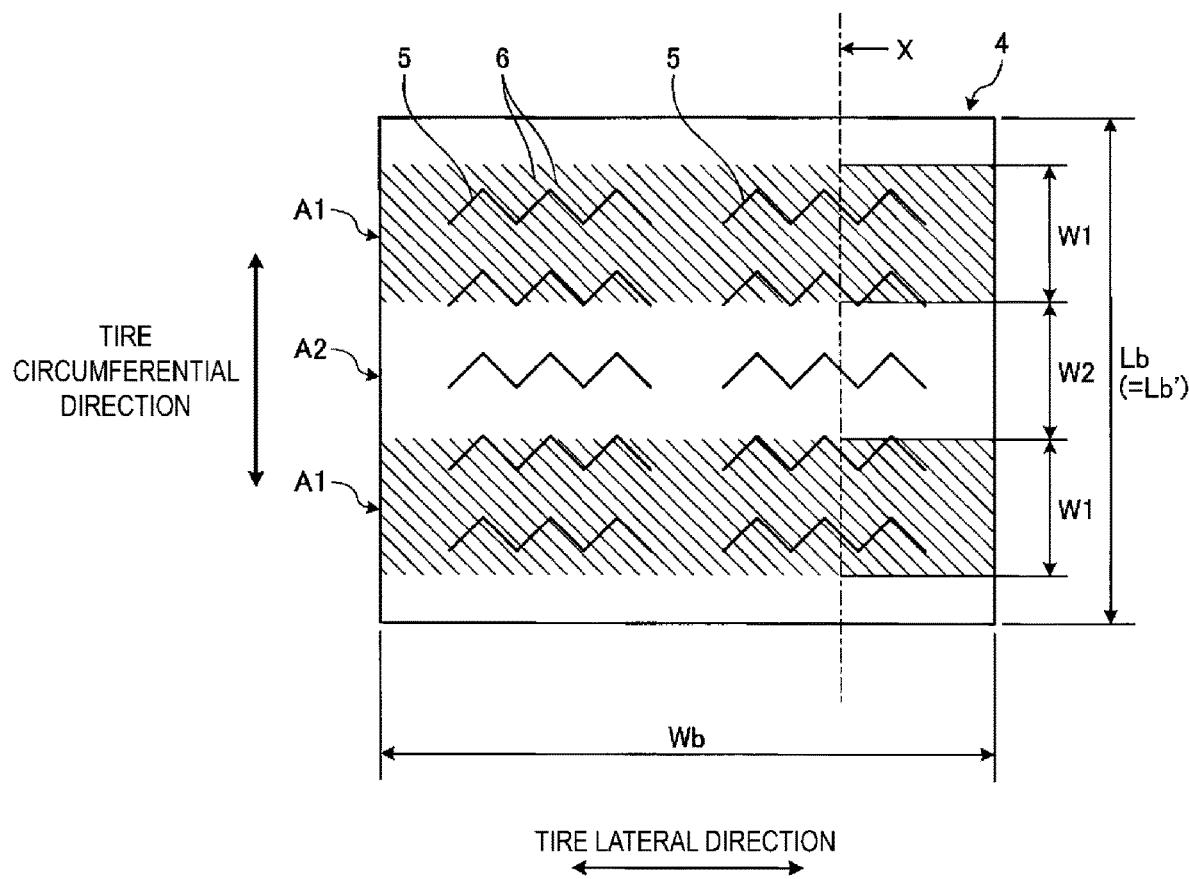
FIG. 22 is an explanatory diagram illustrating a modified example of the road contact surface of the block illustrated in FIG. 3.
Figure 23:
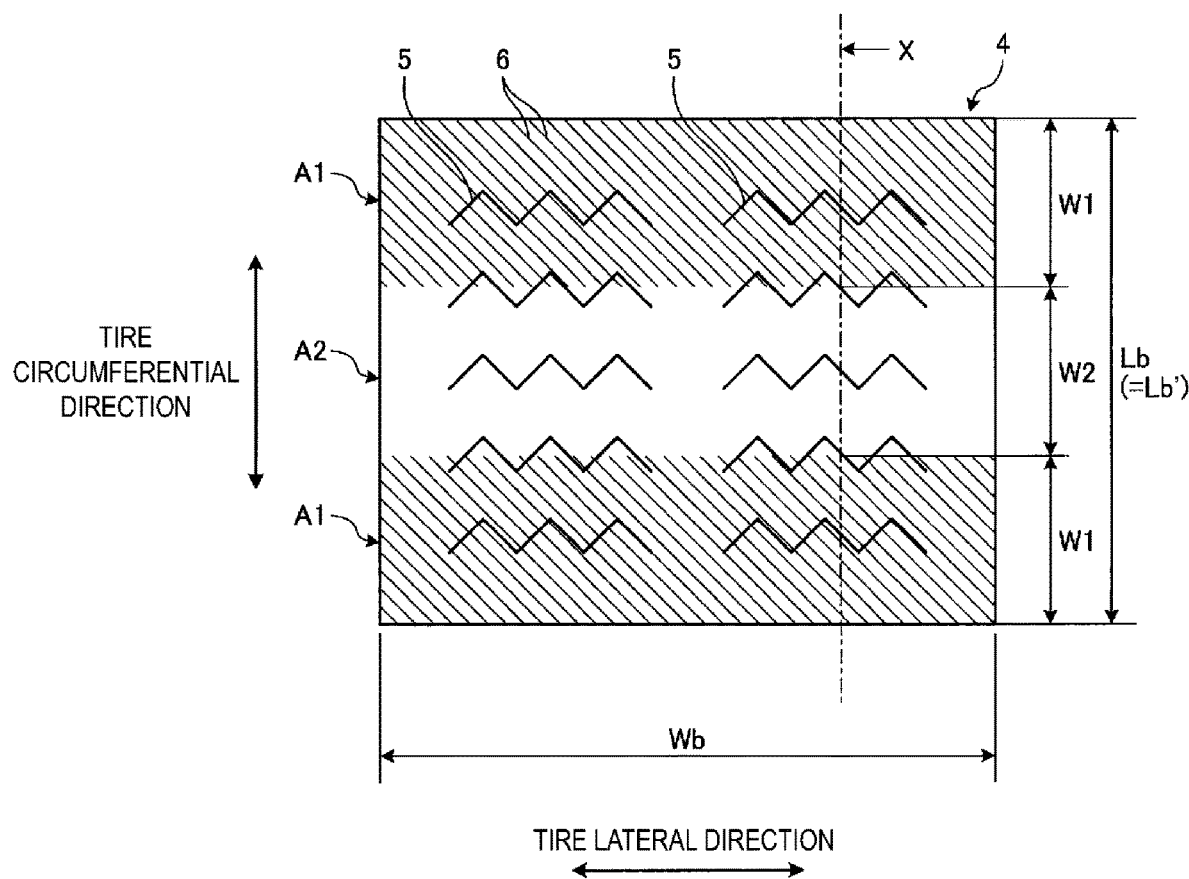
FIG. 23 is an explanatory diagram illustrating a modified example of the road contact surface of the block illustrated in FIG. 3.

However, no such limitation is intended, and as illustrated in FIGS. 21 to 23, it is sufficient that at least one pair of the recess/protrusion regions A1, A1 with the smooth region A2 interposed between the regions A1, A1 be disposed on the road contact surface of the block 4. In this case, as illustrated in FIG. 21, the pair of recess/protrusion regions A1 may be unevenly disposed in one region of the road contact surface of the block 4 in the tire circumferential direction. Additionally, as illustrated in FIG. 22, a pair of the wide recess/protrusion regions A1 may be disposed in the central portion region of the road contact surface of the block 4 in the tire circumferential direction. Furthermore, as illustrated in FIG. 23, a pair of the wide recess/protrusion regions A1, A1 may be disposed at left and right edge portions of the road contact surface of the block 4 in the tire circumferential direction, and one smooth region A2 may be disposed between the recess/protrusion regions A1, A1.

Additionally, in the configuration of FIG. 3, as described above, the block 4 includes the plurality of sipes 5, and each of the sipes 5 alternately meets the recess/protrusion region A1 and the smooth region A2. However, no such limitation is intended, and the sipes 5 may be omitted from the block 4 (not illustrated). Additionally, the blocks 4 may include narrow grooves, notches, or chamfers in the road contact surface, in place of or in addition to the sipes 5 (not illustrated).

FIGS. 24 to 35 are enlarged views illustrating modified examples of the arrangement structure of the recess/protrusion portions illustrated in FIG. 4. In these drawings, components that are the same as the components illustrated in FIG. 1 have the same reference signs, and descriptions of the components are omitted.

In the configuration of FIG. 4, as described above, the boundary line between the recess/protrusion region A1 and the smooth region A2 is straight, and the recess/protrusion region A1 and the smooth region A2 are each generally rectangular (see FIG. 3).

However, no such limitation is intended, and the recess/protrusion region A1 and the smooth region A2 can each have any shape. In other words, as described above, the boundary lines of the recess/protrusion region A1 are drawn by selecting a group of the recess/protrusion portions 6 densely disposed at the predetermined arrangement interval Dc and each having the predetermined recess/protrusion height Hc and width Wc, connecting the outermost end portions and edge portions of the group of recess/protrusion portions 6 together with straight line segments, and approximating the set of the line segments by a smooth straight line or curved line. Thus, in a configuration in which a group of the recess/protrusion portions 6 is arranged with the end portions thereof offset from one another, the boundary line of the recess/protrusion region A1 may have a bent shape or a curved shape.

Figure 24:
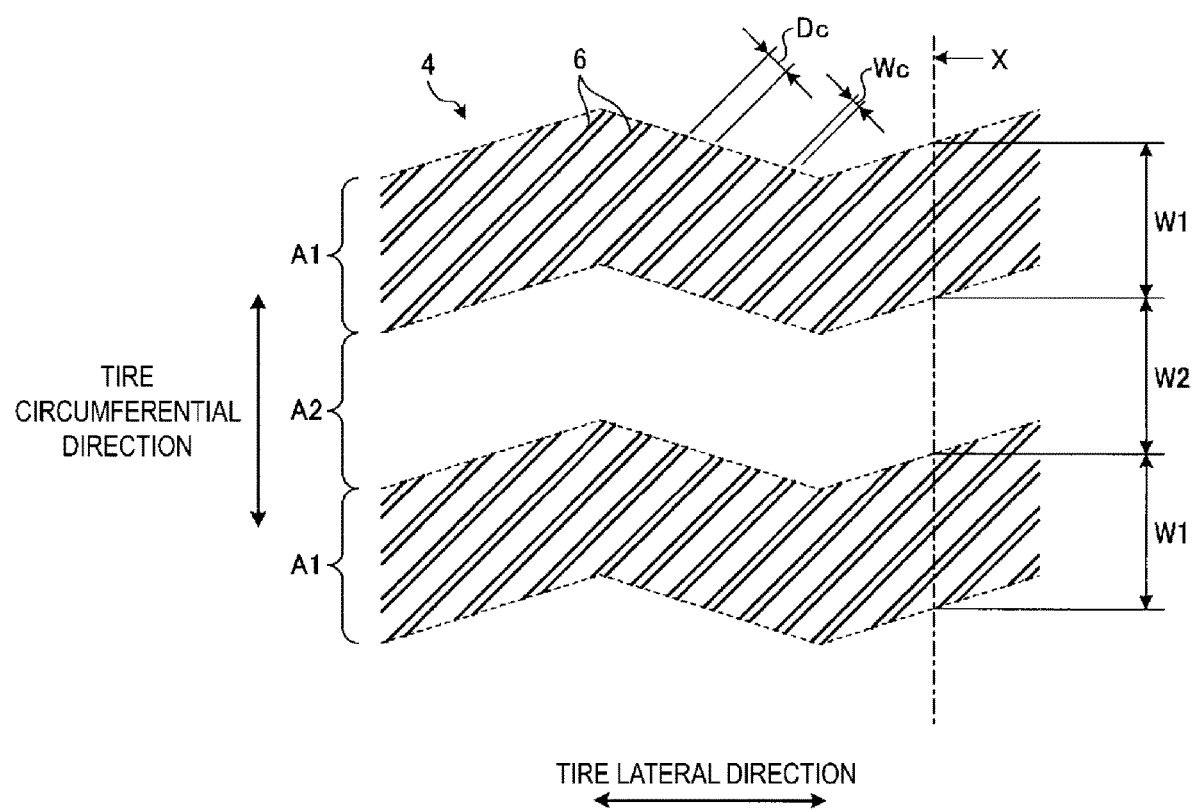
FIG. 24 is an enlarged view illustrating a modified example of an arrangement structure of the recess/protrusion portions illustrated in FIG. 4.
Figure 25:
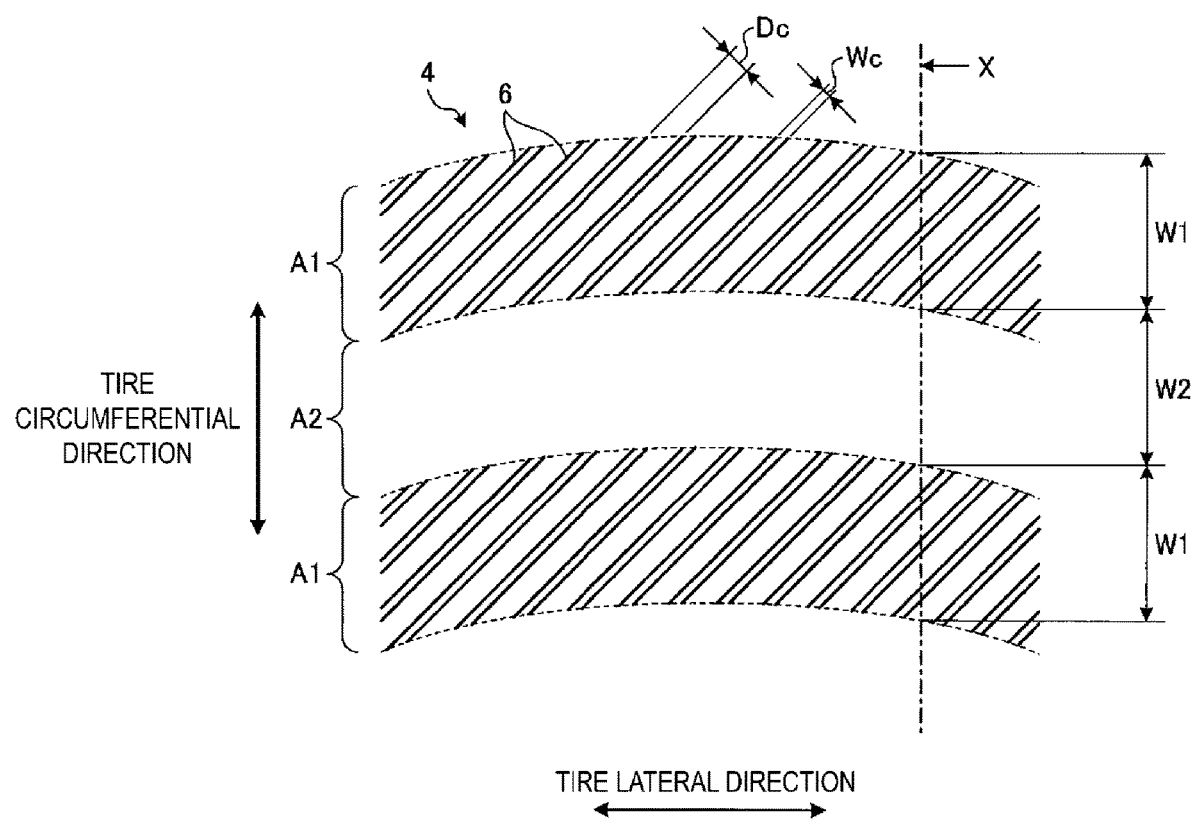
FIG. 25 is an enlarged view illustrating a modified example of the arrangement structure of the recess/protrusion portions illustrated in FIG. 4.

For example, as illustrated in FIG. 24, the recess/protrusion region A1 and the smooth region A2 may have a zigzag shape with an amplitude in the tire circumferential direction or a wave-like shape (not illustrated). Additionally, as illustrated in FIG. 25, the recess/protrusion region A1 and the smooth region A2 may have an arc shape curved in the tire circumferential direction or a bent shape (not illustrated).

Additionally, in the configuration of FIG. 4, the recess/protrusion region A1 and the smooth region A2 have a band-like structure that is long in the tire lateral direction and extend parallel to the tire lateral direction (θ=0) (see FIG. 3). In addition, the recess/protrusion region A1 and the smooth region A2 have the given widths W1, W2.

Figure 26:
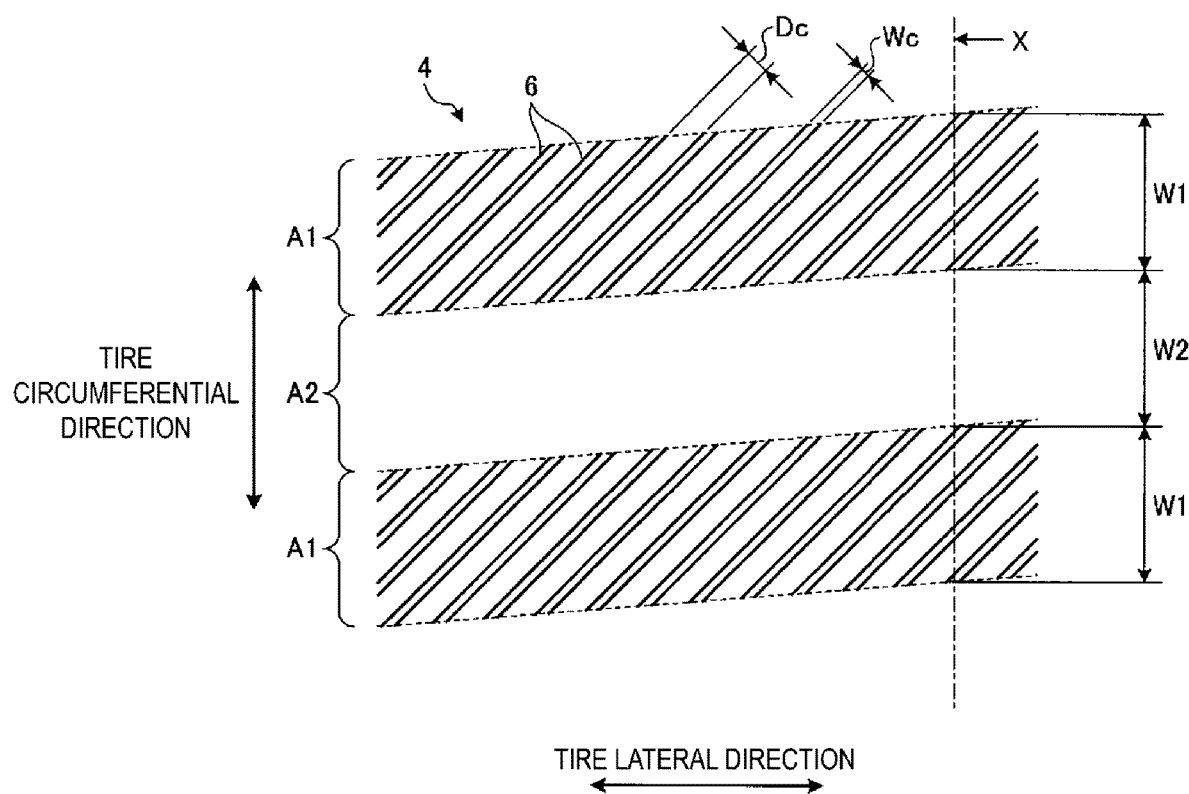
FIG. 26 is an enlarged view illustrating a modified example of the arrangement structure of the recess/protrusion portions illustrated in FIG. 4.

However, no such limitation is intended, and as illustrated in FIG. 26, the longitudinal direction of the recess/protrusion region A1 and the smooth region A2 may be inclined with respect to the tire lateral direction. However, as described above, the angle θ between the longitudinal center line of the recess/protrusion region A1 and the tire lateral direction is preferably in the range $-15$ degrees$\leq \theta \leq 15$ degrees.

Figure 27:
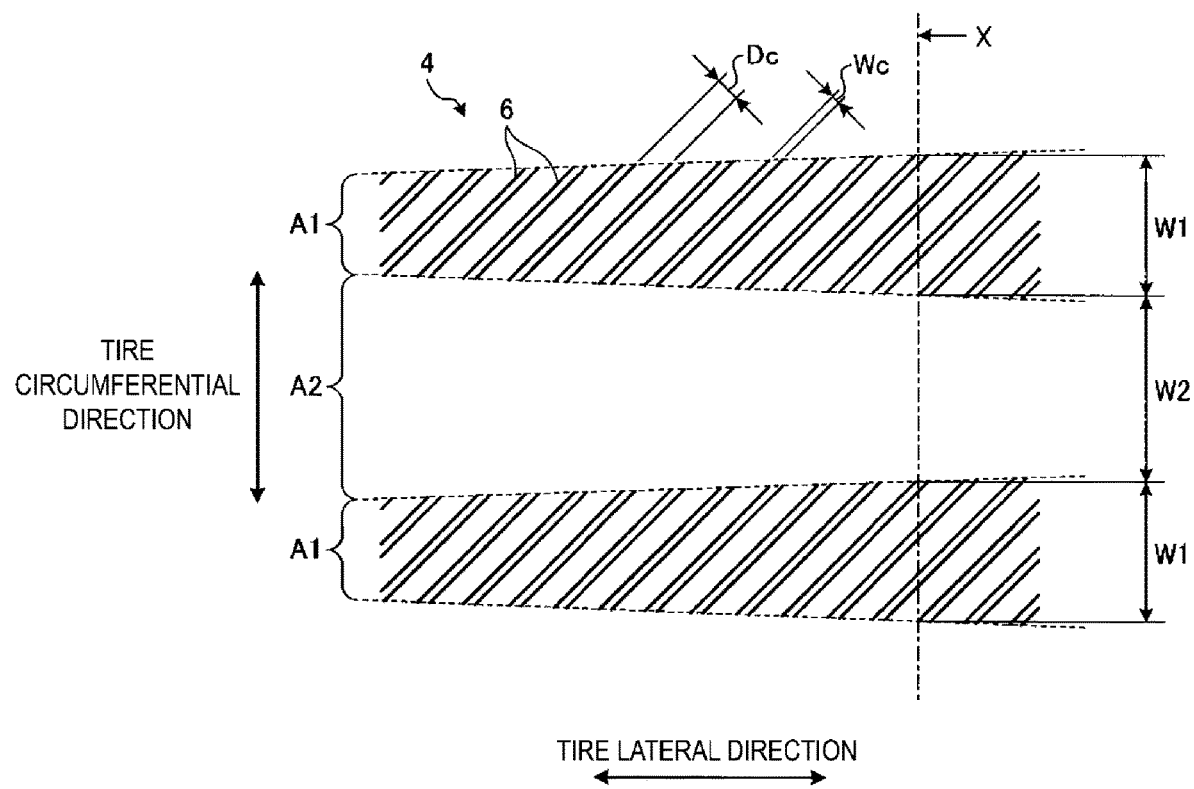
FIG. 27 is an enlarged view illustrating a modified example of the arrangement structure of the recess/protrusion portions illustrated in FIG. 4.

Additionally, as illustrated in FIG. 27, the widths W1, W2 of the recess/protrusion region A1 and the smooth region A2 may vary in the tire lateral direction. For example, in the configuration of FIG. 27, the width W1 of the recess/protrusion region A1 monotonically decreases toward one side in the tire lateral direction, and the width W2 of the smooth region A2 monotonically increases. However, no such limitation is intended, and the width W1 of the recess/protrusion region A1 may increase or conversely decrease from the longitudinally central portion toward both end portions of the recess/protrusion region A1 (not illustrated). Additionally, the widths W1, W2 of the recess/protrusion region A1 and the smooth region A2 may increase or decrease periodically in the longitudinal direction of the recess/protrusion region A1 and the smooth region A2 (not illustrated).

Additionally, in the configuration of FIG. 4, the adjacent recess/protrusion regions A1, A1 are separated from each other. Thus, the boundary lines of the regions are independent of each other without meeting each other.

Figure 28:
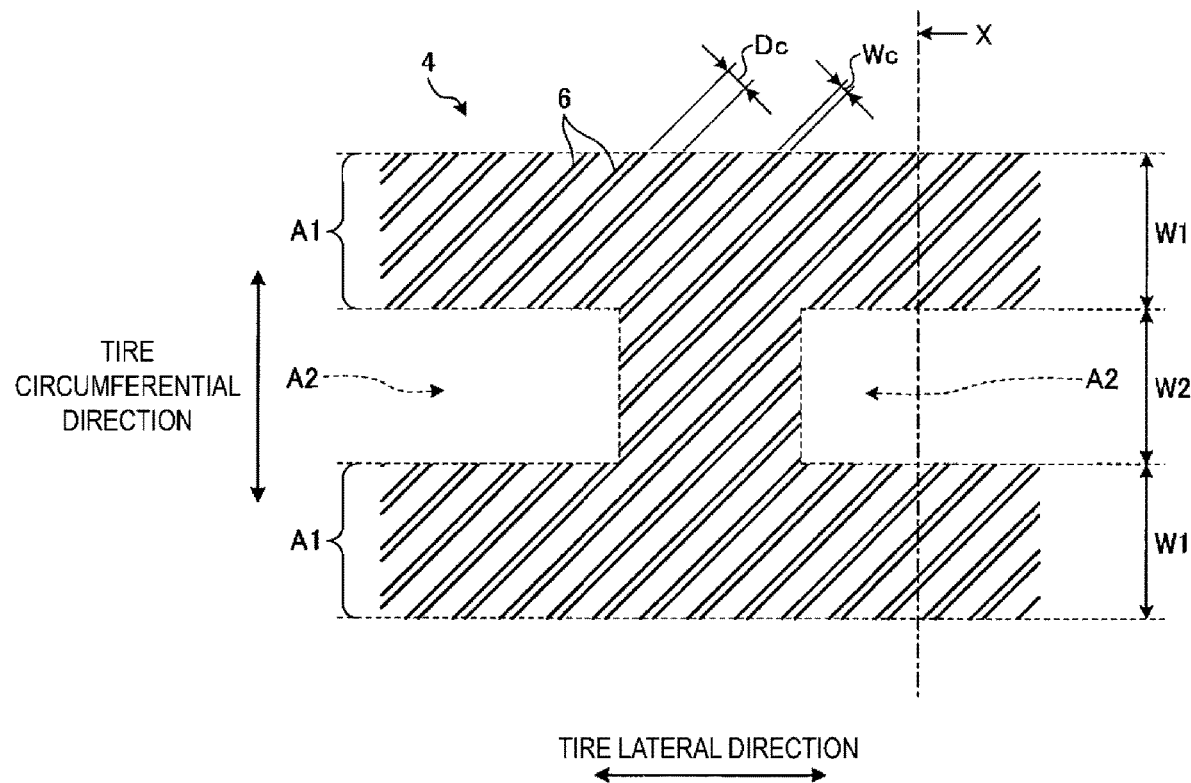
FIG. 28 is an enlarged view illustrating a modified example of the arrangement structure of the recess/protrusion portions illustrated in FIG. 4.
Figure 29:
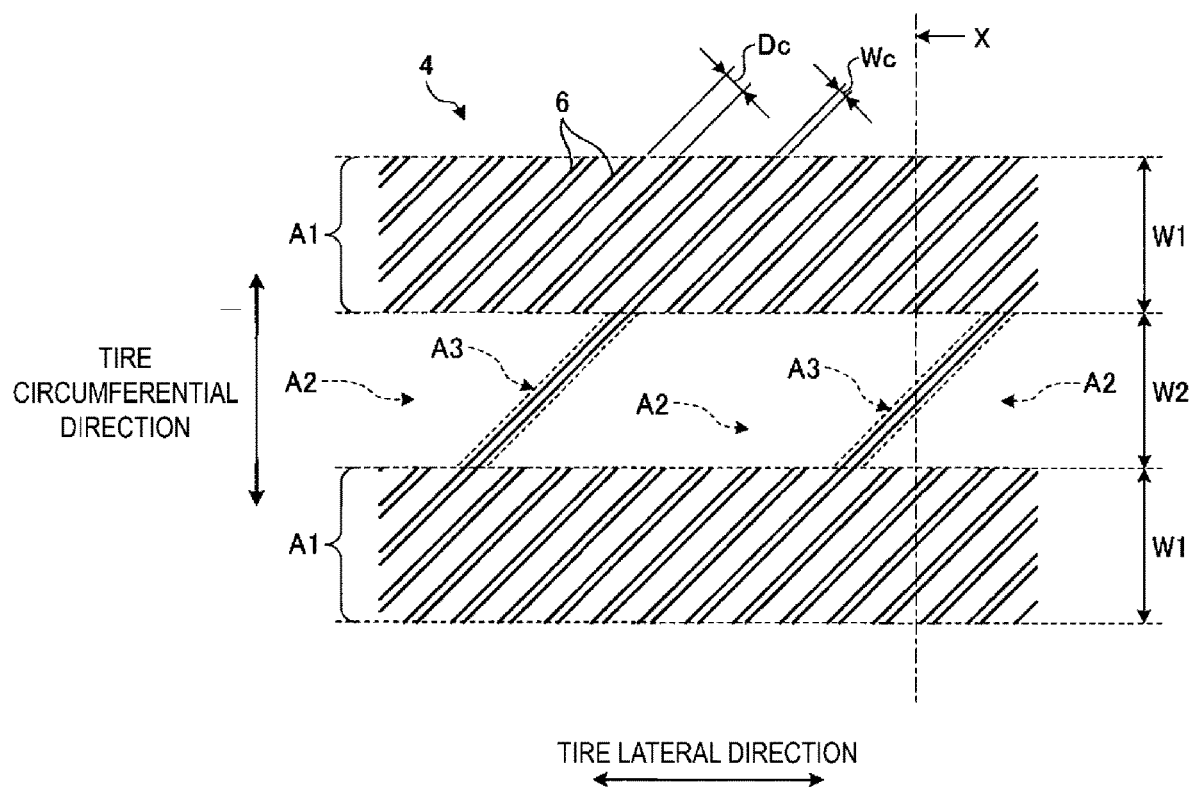
FIG. 29 is an enlarged view illustrating a modified example of the arrangement structure of the recess/protrusion portions illustrated in FIG. 4.

However, no such limitation is intended, and as illustrated in FIGS. 28 and 29, the adjacent recess/protrusion regions A1, A1 may be continuous with each other. In other words, the smooth region A2 can be disposed within one continuous recess/protrusion region A1.

For example, in the configuration of FIG. 28, some of the recess/protrusion portions 6 are extended to form a connection portion (corresponding reference sign is omitted from the drawing), and the adjacent recess/protrusion regions A1, A1 are connected together at the longitudinally central portion via the connecting portion. Additionally, the plurality of recess/protrusion portions 6 are densely disposed at the predetermined arrangement interval Dc in the connection portion, and the connecting portion itself functions as the recess/protrusion region A1. Accordingly, the adjacent recess/protrusion regions A1, A1 are generally H-shaped. As described above, the widths W1, W2 of the recess/protrusion region A1 and the smooth region A2 are defined in the optional cross-section X within the predetermined lateral range. Thus, in the connection portions of the adjacent recess/protrusion regions A1, A1, the width W1 of the recess/protrusion region A1 increases, and the width W2 of the smooth region A2 is zero.

On the other hand, in the configuration of FIG. 29, the recess/protrusion regions A1, A1 are partially connected together at a plurality of sections by one recess/protrusion portion 6. Such one recess/protrusion portion 6 fails to function sufficiently as the recess/protrusion region A1 and is thus defined as the intermediate region A3 that corresponds to neither the recess/protrusion region A1 nor the smooth region A2.

Figure 30:
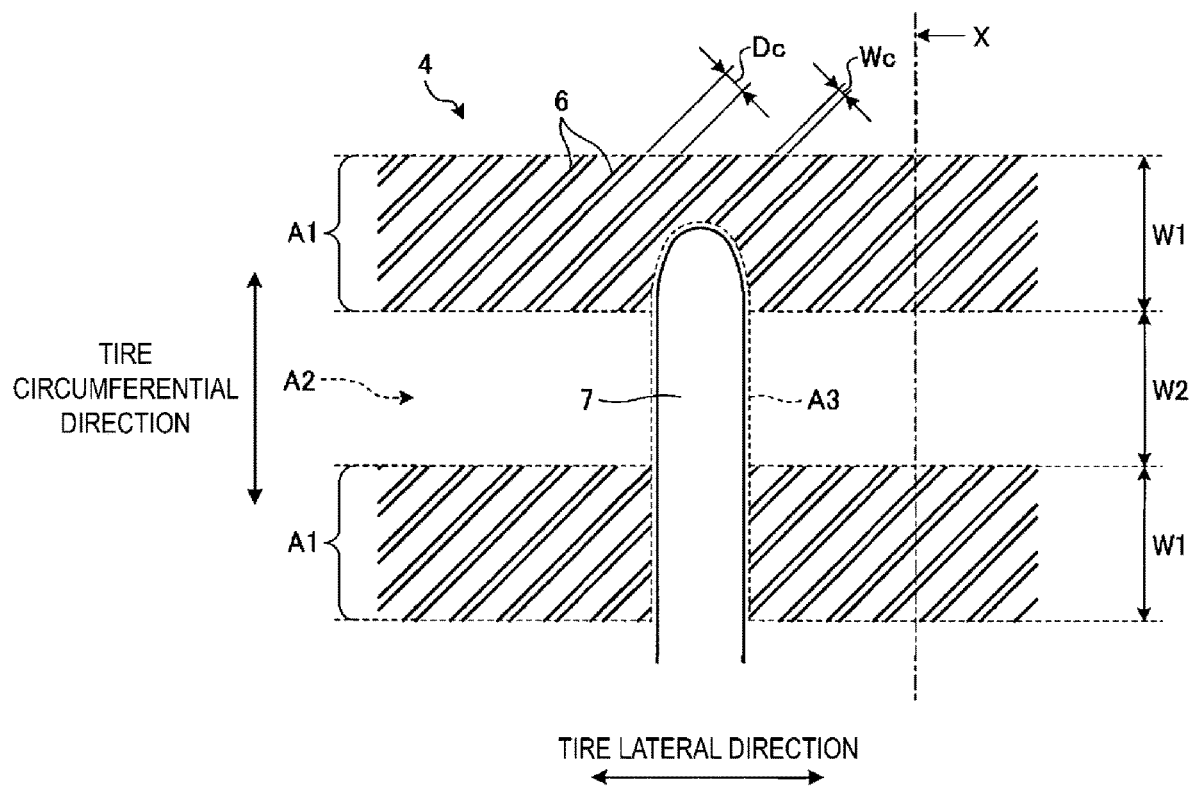
FIG. 30 is an enlarged view illustrating a modified example of the arrangement structure of the recess/protrusion portions illustrated in FIG. 4.

Additionally, as illustrated in FIG. 30, in a configuration in which the road contact surface of the block 4 includes another recess/protrusion portion 7 that does not satisfy the conditions for the recess/protrusion portions 6 forming the recess/protrusion region A1 (for example, a deep narrow groove, a notch portion, or a sipe), the recess/protrusion region A1 and the smooth region A2 are defined as regions excluding such another recess/protrusion portion 7. For example, in the configuration illustrated in FIG. 30, the other recess/protrusion portion 7 passes through the first recess/protrusion region A1 and the smooth region A2 and terminates while meeting the second recess/protrusion region A1. In this case, the intermediate region A3 is defined by the boundary line along the outer edge of the other recess/protrusion portion 7. The intermediate region A3 corresponds to neither the recess/protrusion region A1 nor the smooth region A2. For example, in the configuration of FIG. 30, the first recess/protrusion region A1 and the smooth region A2 are each divided by the intermediate region A3, and a portion of the second recess/protrusion region A1 is cut away by the intermediate region A3.

Additionally, in the configuration of FIG. 4, as described above, the longitudinal direction of the group of recess/protrusion portions 6 forming the recess/protrusion region A1 is inclined with respect to the tire lateral direction at a predetermined inclination angle (corresponding dimension sign is omitted from the drawing). Additionally, each of the recess/protrusion portions 6 is continuous within the recess/protrusion region A1. In the configuration of FIG. 4, the recess/protrusion portions 6 are narrow shallow grooves.

Figure 31:
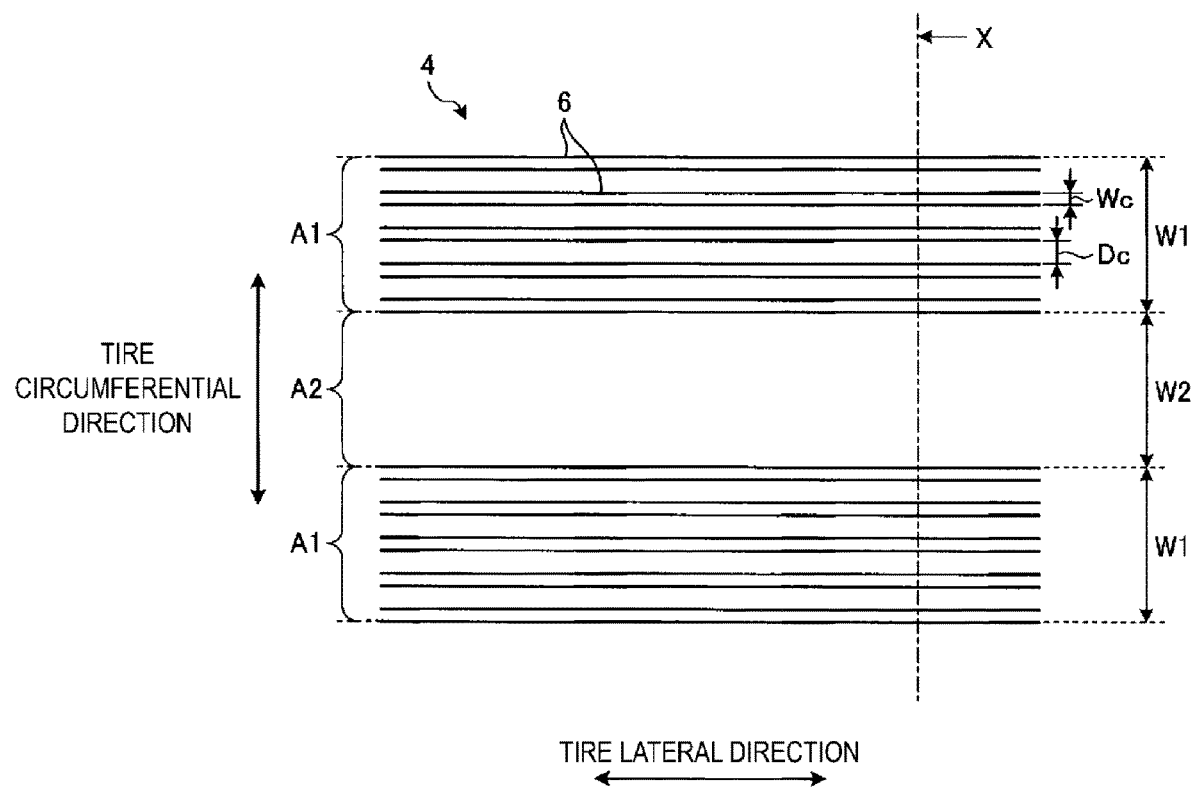
FIG. 31 is an enlarged view illustrating a modified example of the arrangement structure of the recess/protrusion portions illustrated in FIG. 4.

However, no such limitation is intended, and as illustrated in FIG. 31, the group of recess/protrusion portions 6 forming the recess/protrusion region A1 may extend substantially perpendicularly to the tire circumferential direction. Specifically, the angle formed between the longitudinal direction of the recess/protrusion portions 6 and the tire circumferential direction preferably ranges from more than 70 degrees to 90 degrees. For example, in the configuration of FIG. 31, all of the recess/protrusion portions 6 extend perpendicularly to the tire circumferential direction. In such a configuration, a group of the recess/protrusion portions 6 densely disposed at a predetermined small arrangement interval Dc is selected, and boundary lines of the recess/protrusion region A1 are drawn along outer edges of outermost ones of the recess/protrusion portions 6. Additionally, a region between the adjacent recess/protrusion portions 6, 6 disposed at the large arrangement interval Dc is defined as the smooth region A2, provided that the region has a predetermined flat road contact surface.

Figure 32:
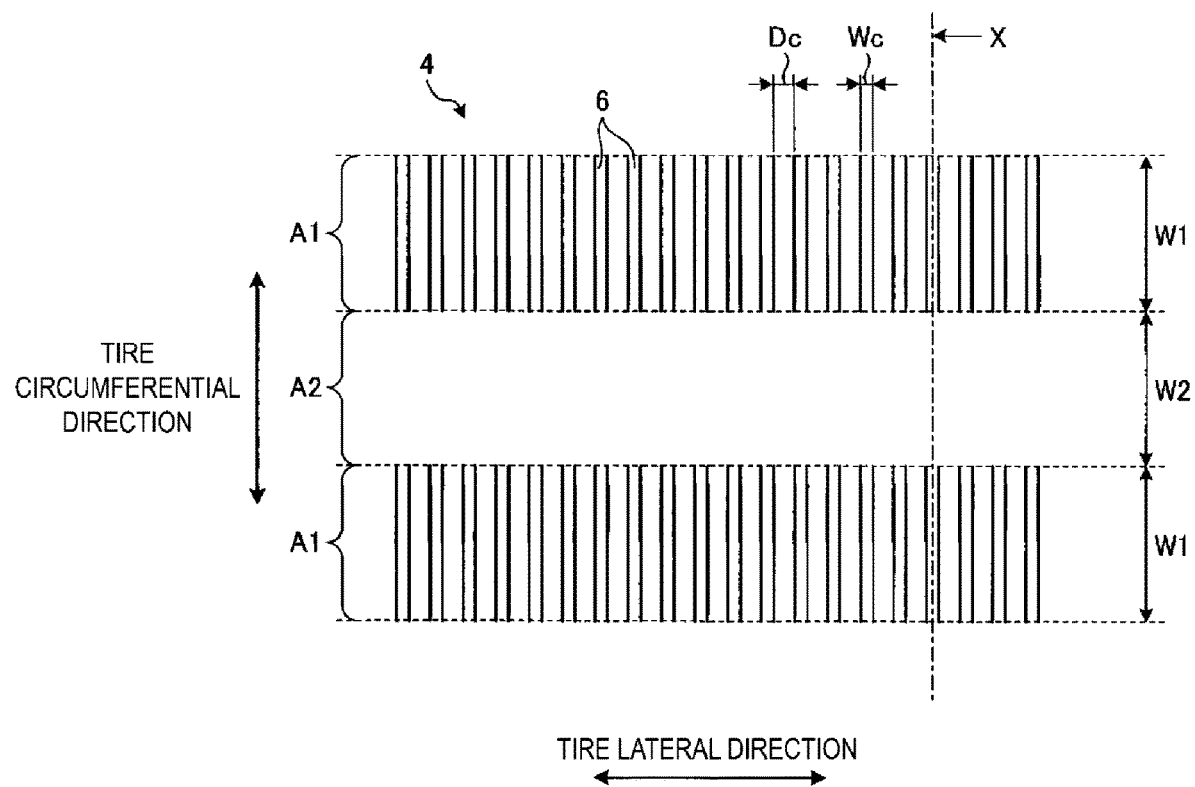
FIG. 32 is an enlarged view illustrating a modified example of the arrangement structure of the recess/protrusion portions illustrated in FIG. 4.

Additionally, as illustrated in FIG. 32, a group of the recess/protrusion portions 6 forming the recess/protrusion region A1 may extend substantially parallel to the tire circumferential direction. Specifically, the angle between the longitudinal direction of the recess/protrusion portions 6 and the tire circumferential direction preferably ranges from 0 degrees to 20 degrees. For example, in the configuration of FIG. 32, all of the recess/protrusion portions 6 extend parallel to the tire circumferential direction.

Figure 33:
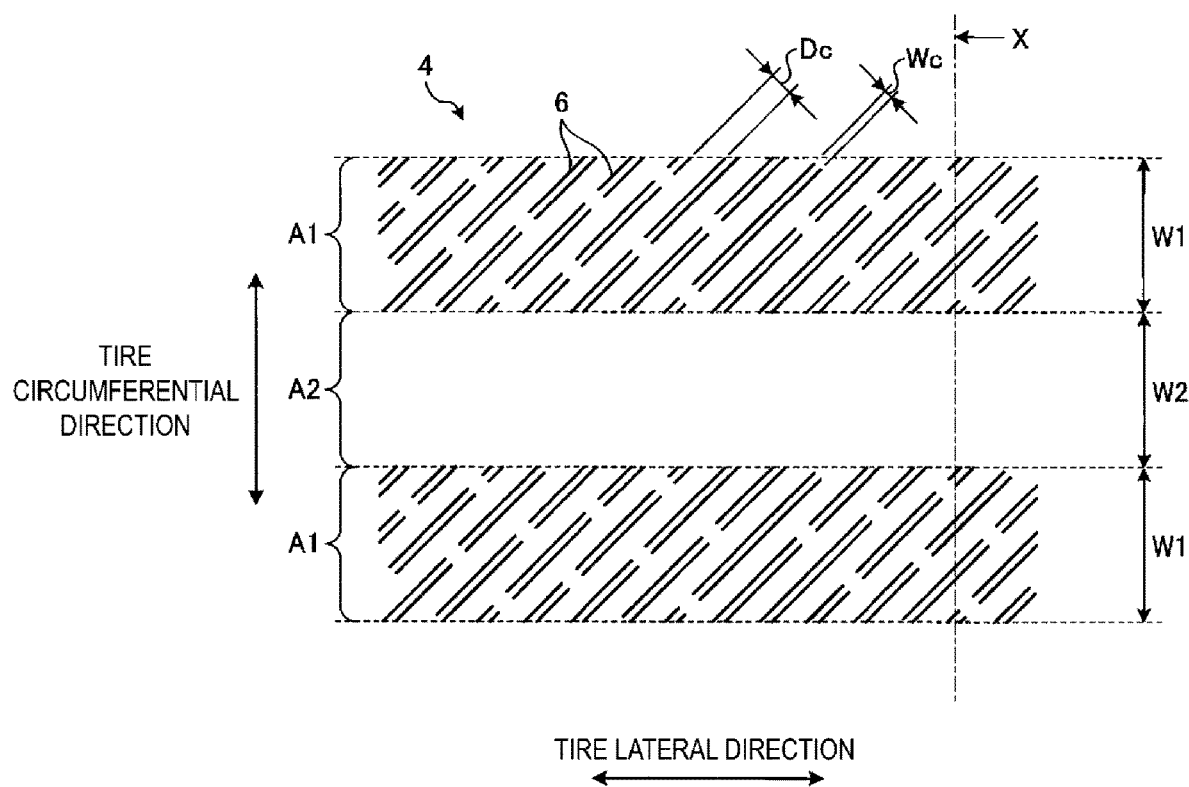
FIG. 33 is an enlarged view illustrating a modified example of the arrangement structure of the recess/protrusion portions illustrated in FIG. 4.

Additionally, as illustrated in FIG. 33, the recess/protrusion portions 6 may be divided within the recess/protrusion region A1. For example, in the configuration of FIG. 33, the recess/protrusion portions 6 in the recess/protrusion region A1 are short narrow shallow grooves, and at least one end portion of each recess/protrusion portion 6 is located inside the recess/protrusion region A1 instead of traversing the recess/protrusion region A1.

Figure 34:
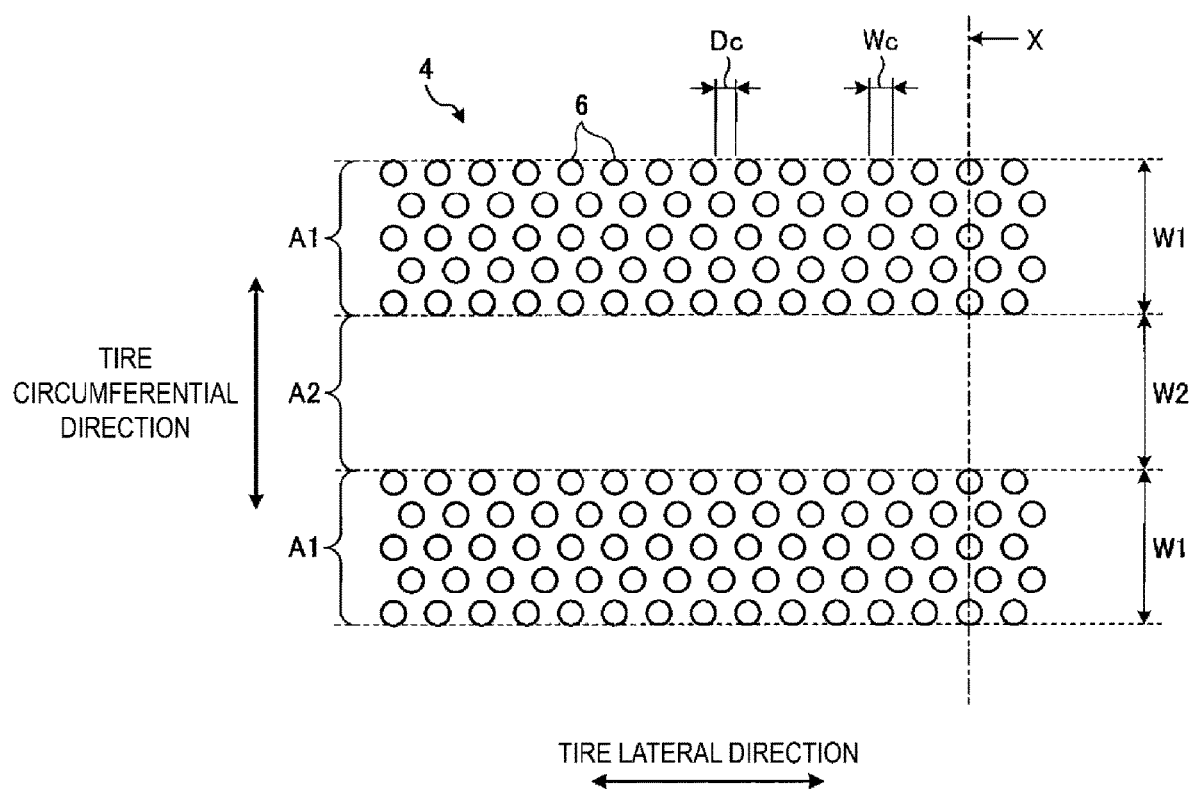
FIG. 34 is an enlarged view illustrating a modified example of the arrangement structure of the recess/protrusion portions illustrated in FIG. 4.

Additionally, as illustrated in FIG. 34, the recess/protrusion portions 6 may be dimples. For example, in the configuration of FIG. 34, each recess/protrusion portion 6 is a spherical or cylindrical dimple with a small depth (recess/protrusion height Hc. See FIG. 6) and a small outer diameter (width Wc). Additionally, a group of the recess/protrusion portions 6 is densely arranged at a predetermined arrangement interval Dc and in a staggered manner in the tire circumferential direction and the tire lateral direction. The recess/protrusion portions 6 form the band-like recess/protrusion region A1 Additionally, the smooth region A2 is formed between the adjacent recess/protrusion regions A1, A1.

Figure 35:
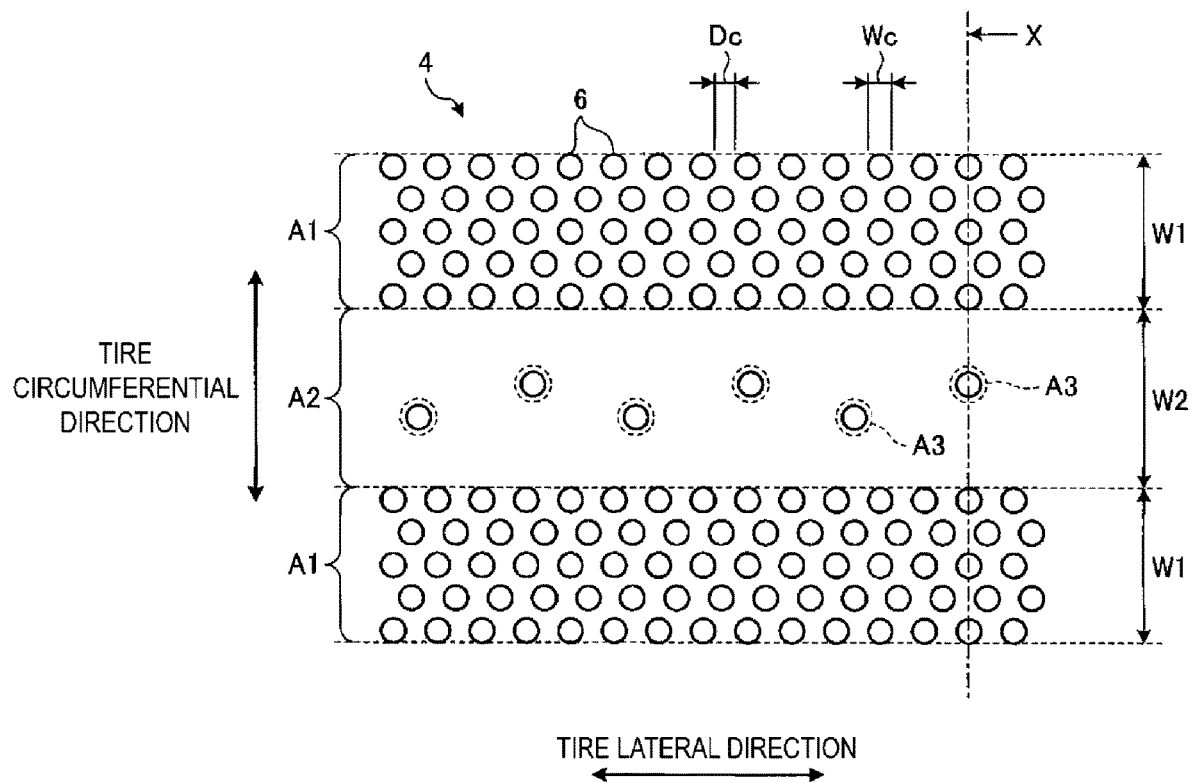
FIG. 35 is an enlarged view illustrating a modified example of the arrangement structure of the recess/protrusion portions illustrated in FIG. 4.

Additionally, as illustrated in FIG. 35, in the configuration of FIG. 34, the recess/protrusion portions 6 isolated from the group of recess/protrusion portions 6 forming the recess/protrusion region A1 may be disposed in the smooth region A2. In other words, with the large arrangement interval Dc between each of the isolated recess/protrusion portions 6 and the group of recess/protrusion portions 6, the isolated recess/protrusion portions 6 are not included in either of the recess/protrusion region A1 or the smooth region A2 but form the intermediate region A3. Note that, in a configuration in which a plurality of the recess/protrusion portions 6 in the smooth region A2 are disposed densely at the small arrangement interval Dc (not illustrated), the recess/protrusion portions 6 form one recess/protrusion region A1.

FIGS. 36 to 39 are explanatory diagrams illustrating modified examples of the recess/protrusion portions illustrated in FIGS. 5 and 6.

In the configuration of FIG. 3, as illustrated in FIGS. 5 and 6, the recess/protrusion portions 6 are narrow shallow grooves.

Figure 36:
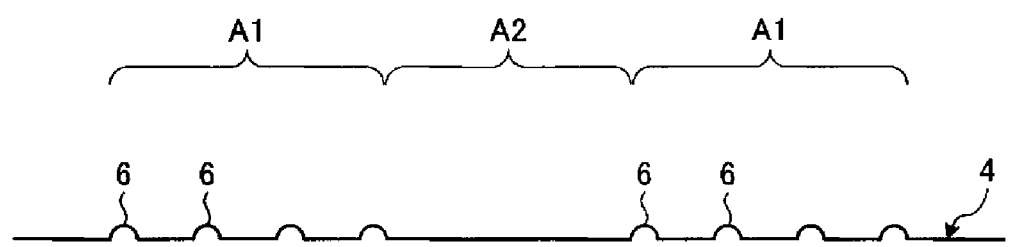
FIG. 36 is an explanatory diagram of a modified example of the recess/protrusion portions illustrated in FIGS. 5 and 6.
Figure 37:
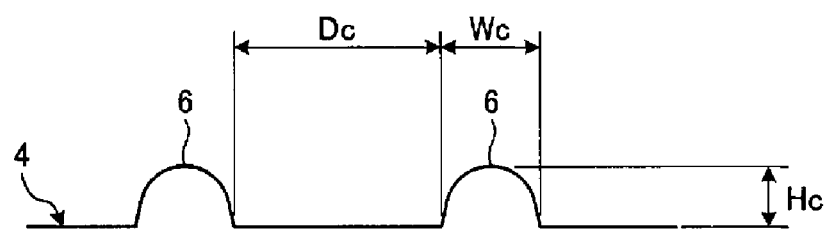
FIG. 37 is an explanatory diagram of a modified example of the recess/protrusion portions illustrated in FIGS. 5 and 6.
Figure 38:
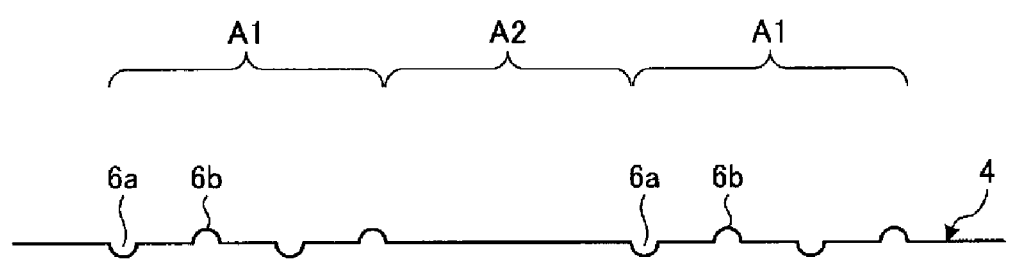
FIG. 38 is an explanatory diagram of a modified example of the recess/protrusion portions illustrated in FIGS. 5 and 6.
Figure 39:
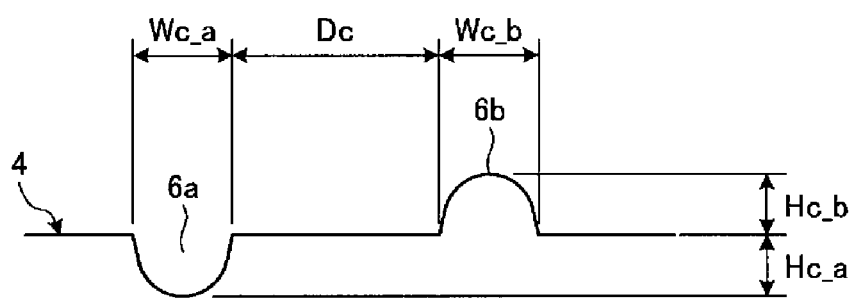
FIG. 39 is an explanatory diagram of a modified example of the recess/protrusion portions illustrated in FIGS. 5 and 6.

However, no such limitation is intended, and as illustrated in FIGS. 36 and 37, the recess/protrusion portions 6 may be protrusion portions each with the predetermined recess/protrusion height Hc and the predetermined width Wc (for example, narrow ribs or small protrusions). Additionally, as illustrated in FIGS. 38 and 39, a group of the recess/protrusion portions 6 may include both recess portions and protrusion portions. Also in such a case, a group of the recess/protrusion portions 6 is densely arranged at the predetermined arrangement interval Dc to form a recess/protrusion region A1. Note that, as illustrated in FIG. 39, in a configuration in which recess portions 6a and protrusion portions 6b are mixed, the widths Wc (Wc_a, Wc_b) and the recess/protrusion heights Hc (Hc_a, Hc_b) of the recess portion 6a and the protrusion portion 6b are measured with reference to a flat region on the road contact surface of the block 4.

Figure 40:
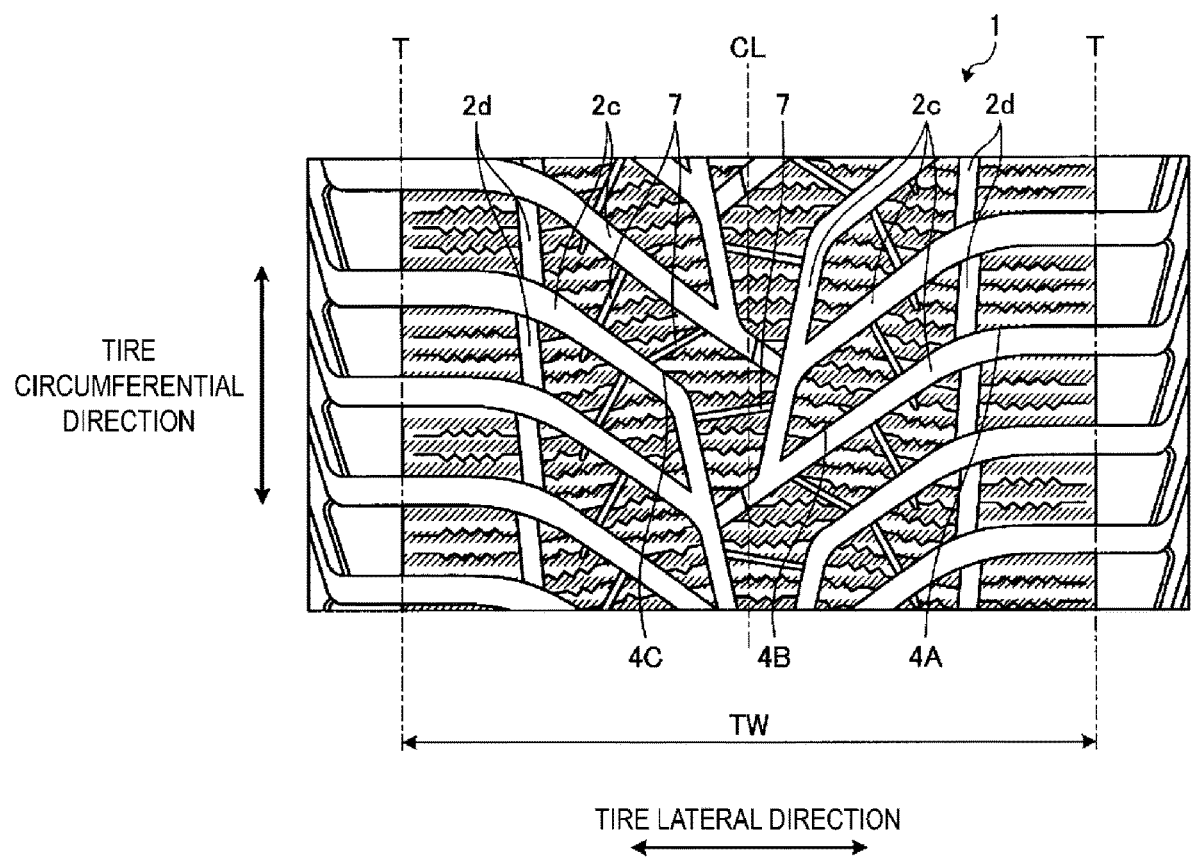
FIG. 40 is a plan view illustrating a modified example of the tread surface illustrated in FIG. 2.
Figure 41:
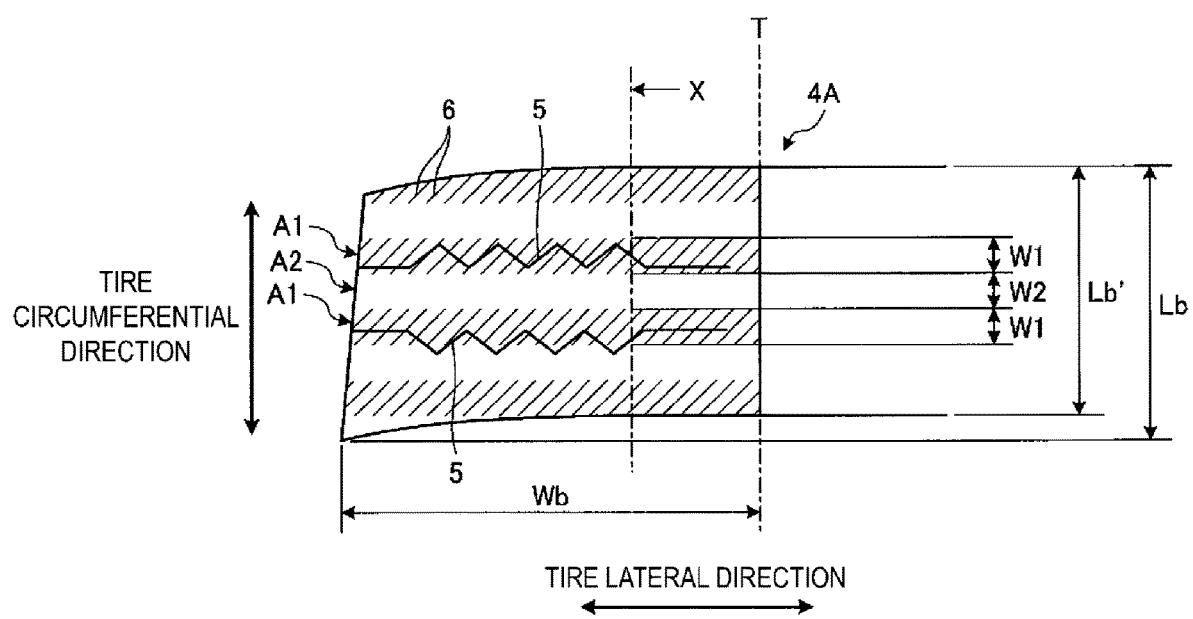
FIG. 41 is a plan view illustrating a road contact surface of a block illustrated in FIG. 40.
Figure 42:
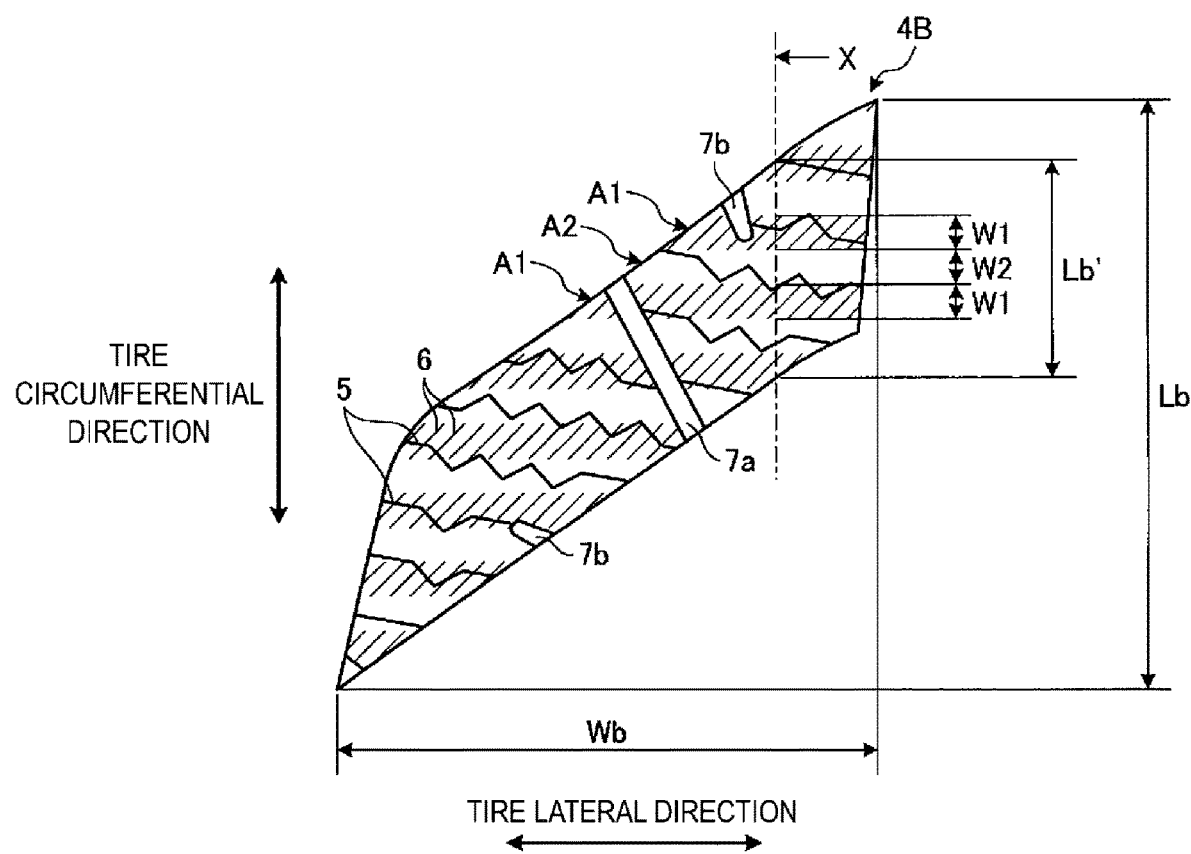
FIG. 42 is a plan view illustrating the road contact surface of the block illustrated in FIG. 40.
Figure 43:
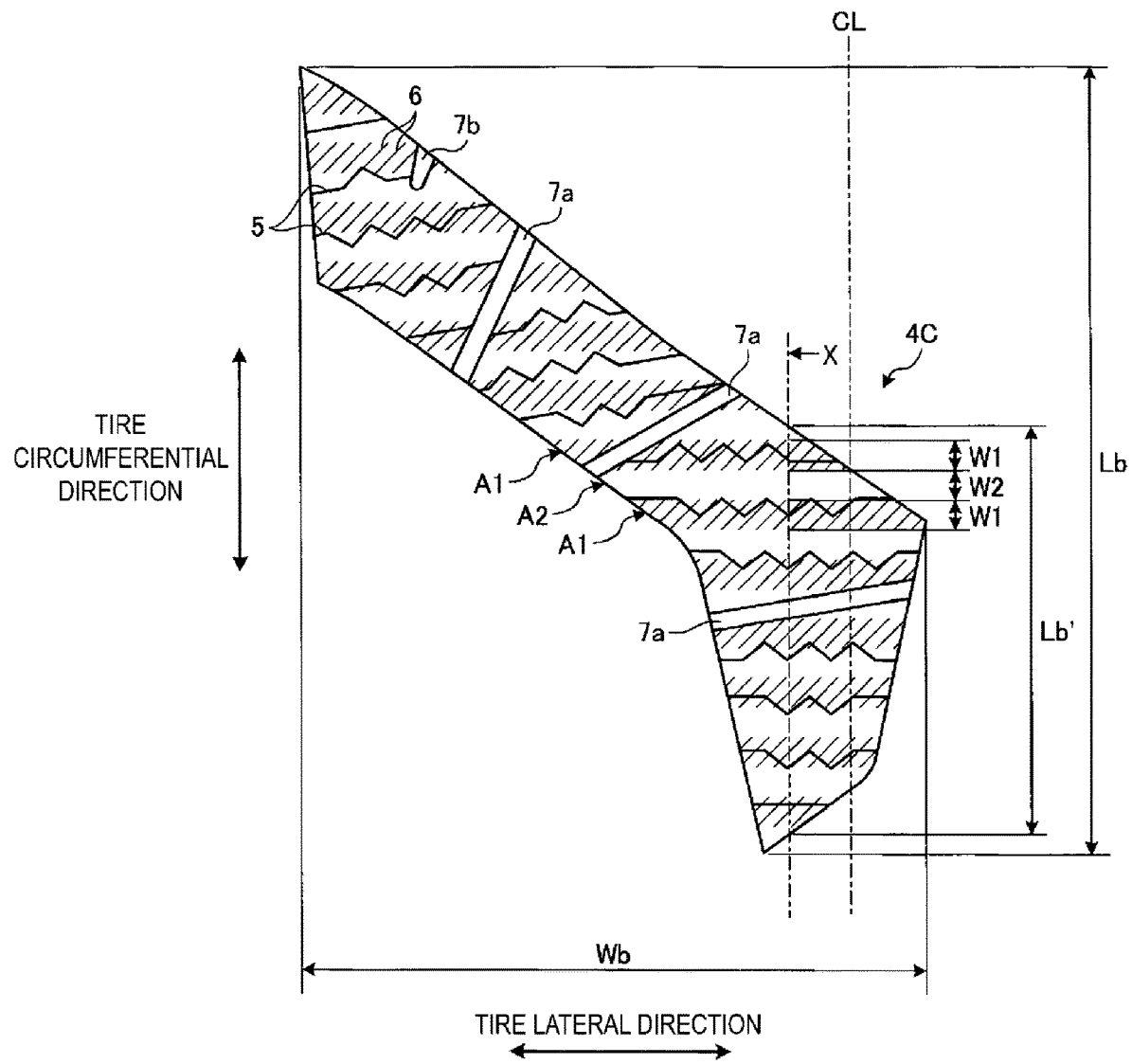
FIG. 43 is a plan view illustrating the road contact surface of the block illustrated in FIG. 40.

FIG. 40 is a plan view illustrating a modified example of the tread surface illustrated in FIG. 2. The same drawing illustrates a tread pattern of a winter studless tire. Additionally, FIGS. 41 to 43 are plan views illustrating the road contact surface of the block illustrated in FIG. 40. The drawings illustrate one block 4 defined by grooves 2c, 2d (see FIG. 40). Additionally, in the drawings, components that are the same as the components illustrated in FIG. 2 have the same reference signs, and descriptions of the components are omitted.

In the configuration of FIG. 2, the grooves 2a are circumferential main grooves and extend continuously all around the circumference of the tire. Additionally, the grooves 2b are through lug grooves penetrating the tread surface in the tire lateral direction and opening at the left and right tire ground contact edges T. Additionally, a plurality of the grooves 2a, 2b each have a predetermined groove width and a predetermined groove depth, are arranged in a lattice-like manner, and communicate with one another. Accordingly, five rows of blocks are defined in the tire lateral direction.

In contrast, in the configuration of FIG. 40, the grooves 2c are inclined lug grooves inclined with respect to the tire circumferential direction and extending from the vicinity of the tire equatorial plane CL toward the tire ground contact edge T while increasing, in a stepwise manner, the inclination angle with respect to the tire circumferential direction. Additionally, the grooves 2c are main grooves required to have a wear indicator as specified by JATMA. Additionally, a plurality of the grooves 2c communicate with one another in a V-shaped manner to form a directional tread pattern. Additionally, the grooves 2d are circumferential groove extending in the tire circumferential direction and are disposed in a tread portion shoulder region to connect adjacent grooves 2c, 2c together. The grooves 2c, 2c each have the predetermined groove width and groove depth to define a plurality of types of blocks 4A, 4B, 4C.

In the configuration of FIG. 41, the blocks 4A are located on the tire ground contact edge T and are each defined by a pair of the inclined lug grooves 2c, 2c and the circumferential groove 2d (see FIG. 40). Additionally, the block 4 A has a generally slightly distorted rectangular shape or trapezoidal shape. Additionally, the road contact surface of the block 4A, in other words, the ground contact region, is defined by the tire ground contact edge T, and a plurality of recess/protrusion portions 6 are formed on the road contact surface of the block 4A. Additionally, a group of the recess/protrusion portions 6 is arranged densely at the predetermined arrangement interval Dc (see FIG. 4) to form the band-like recess/protrusion region A1 that is long in the tire lateral direction. Additionally, a plurality of the recess/protrusion regions A1 are disposed side by side in the tire circumferential direction. Additionally, the smooth region A2 is disposed between the adjacent recess/protrusion regions A1, A1. Additionally, a plurality of the sipes 5 extend in the tire lateral direction and meet the recess/protrusion region A1 and the smooth region A2. Note that in the configuration of FIG. 41, the recess/protrusion regions A1 are formed only in the region on the inner side of the tire ground contact edge T, but no such limitation is intended, and the recess/protrusion regions A1 may be formed in a region on the outer side of the tire ground contact edge T, that is, in a non-ground contact region (not illustrated).

In the configuration of FIG. 42, the blocks 4B are located in a tread portion center region and are each defined by a pair of the inclined lug grooves 2c, 2c and the circumferential groove 2d (see FIG. 40). Additionally, the block 4B has a long, generally parallelogram shape and has a longitudinal direction inclined with respect to the tire circumferential direction. Additionally, a plurality of the recess/protrusion portions 6 are formed on the road contact surface of the block 4B. Additionally, a group of the recess/protrusion portions 6 is arranged densely at the predetermined arrangement interval Dc (see FIG. 4) to form the band-like recess/protrusion region A1 that is long in the tire lateral direction. Additionally, a plurality of the recess/protrusion regions A1 are disposed side by side along the longitudinal direction of the block 4B. Additionally, the smooth region A2 is disposed between the adjacent recess/protrusion regions A1, A1. Additionally, a plurality of the sipes 5 extend in the tire lateral direction and meet the recess/protrusion region A1 and the smooth region A2. The block 4B includes a narrow groove 7a and a notch portion 7b that are deeper than the recess/protrusion portions 6. Additionally, the narrow groove 7a and notch portion 7b meet the recess/protrusion region A1 and the smooth region A2.

In the configuration of FIG. 43, the blocks 4C are located on the tire equatorial plane CL and are each defined by a plurality of the inclined lug grooves 2c and the circumferential grooves 2d (see FIG. 40). Additionally, the block 4C has a substantially L shape including a long portion and a short portion connected together. The long portion extends in the tire lateral direction while inclining with respect to the tire circumferential direction, and the short portion extends in the tire circumferential direction along the tire equatorial plane CL. Additionally, a plurality of the recess/protrusion portions 6 are formed on the road contact surface of the block 4C. Additionally, a group of the recess/protrusion portions 6 is arranged densely at the predetermined arrangement interval Dc (see FIG. 4) to form the band-like recess/protrusion region A1 that is long in the tire lateral direction. Additionally, a plurality of the recess/protrusion regions A1 are disposed side by side along the longitudinal direction of the block 4C. Additionally, the smooth region A2 is disposed between the adjacent recess/protrusion regions A1, A1. Additionally, a plurality of the sipes 5 extend in the tire lateral direction and meet the recess/protrusion region A1 and the smooth region A2. The block 4C includes the narrow grooves 7a and notch portions 7b that are deeper than the recess/protrusion portions 6. Additionally, the narrow groove 7a and notch portion 7b meet the recess/protrusion region A1 and the smooth region A2.

Effects

As described above, the pneumatic tire 1 includes the plurality of blocks 4 on the tread surface (see FIG. 2). Additionally, the block 4 includes the plurality of recess/protrusion portions 6 on the road contact surface (see FIG. 3). Additionally, the recess/protrusion height Hc (see FIG. 6) of the recess/protrusion portion 6 is in the range $0.1 \text{ mm} \leq Hc \leq 1.0 \text{ mm}$ Additionally, the width Wc (see FIG. 4) of the recess/protrusion portion 6 is in the range $0.1 \text{ mm} \leq Wc \leq 0.8 \text{ mm}$. The recess/protrusion region A1 is defined as a region where the arrangement interval Dc between the adjacent recess/protrusion portions 6 is in the range $Dc \leq 1.2 \text{ mm}$. The smooth region A2 is defined as a region other than the recess/protrusion region A1 and in which the arithmetic mean roughness Ra of the road contact surface of the block 4 is in the range $Ra \leq 50 \text{ μm}$. The cross-section X perpendicular to the tire lateral direction is defined. The lateral length Wb of the road contact surface of the block 4 in the tire lateral direction is defined. In this case, the block 4 includes the recess/protrusion region A1 and the smooth region A2 in the optional cross-section X within the lateral range of not less than 40% of the lateral length Wb of the road contact surface of the block 4 (see FIGS. 3 and 4).

In such a configuration, (1) since the road contact surface of the blocks 4 includes the recess/protrusion region A1 including densely-disposed, fine recess/protrusion portions 6, the recess/protrusion region A1 absorbs and removes a water film from an icy road surface. Additionally, the flat smooth region A2 of the road contact surface of the block 4 provides the appropriate contact area of the block 4 on the icy road surface. The mixed arrangement of the recess/protrusion region A1 and the smooth region A2 improves the adhesive friction force of the smooth region A2 acting on the icy road surface. This has the advantage of improving the grounding characteristics of the block 4 on the icy road surface, thus synergistically improving the tire performance on ice.

In particular, (2) in vehicle braking and driving conditions, the road contact surface of the block 4 comes into contact with the icy road surface while sliding in the tire circumferential direction. At this time, due to the mixed arrangement of the recess/protrusion regions A1 and the smooth regions A2 in the tire circumferential direction (that is, on the cross-section X perpendicular to the tire lateral direction), the synergistic action of the recess/protrusion regions A1 and the smooth regions A2 improves the grounding characteristics of the block 4. Accordingly, the tire braking performance on ice and the tire driving performance on snow are efficiently improved.

Additionally, (3) the recess/protrusion height Hc, the width Wc, and the arrangement interval Dc of the recess/protrusion portions 6 forming the recess/protrusion region A1 are within the numerical ranges described above. This has the advantage of appropriately ensuring the water film absorbing action of the recess/protrusion region A1. In a case where the numerical ranges are excessively large or small, the water film absorption action of the recess/protrusion region A1 is degraded.

Additionally, (4) since the lower limits of the widths W1, W2 of the recess/protrusion region A1 and the smooth region A2 are within the ranges described above, the above-described actions of the recess/protrusion region A1 and the smooth region A2 are appropriately ensured.

Additionally, in the pneumatic tire 1, the smooth region A2 is disposed between the adjacent recess/protrusion regions A1, A1 (see FIG. 3). In such a configuration, the adjacent recess/protrusion regions A1, A1 absorb the water film from the icy road surface on both sides of the smooth region A2. This has the advantage of improving the adhesive function force of the smooth region A2 acting on the icy road surface, thus further improving the tire performance on ice.

Additionally, in the pneumatic tire 1, the smooth regions A2 are each disposed between three or more recess/protrusion regions A1 (see FIG. 3). In other words, within the predetermined lateral range, the three or more recess/protrusion regions A1 are arranged with the smooth region A2 interposed between the regions A1 so as to form a striped pattern. This has the advantage that the adhesion friction force of the smooth region A2 acting on the icy road surface is further improved.

Additionally, in the pneumatic tire 1, the width W1 of the recess/protrusion region A1 is in the range 1.0 mm≤W1, and the width W2 of the smooth region A2 is in the range 2.0 mm≤W2 (see FIG. 3). This has the advantage of providing the appropriate widths W1, W2 of the recess/protrusion region A1 and the smooth region A2, thus ensuring the functions of the recess/protrusion region A1 and the smooth region A2.

Additionally, in the pneumatic tire 1, the width W1 of the recess/protrusion region A1 and the width W2 of the smooth region A2 adjacent to the recess/protrusion region A1 have the relationship 0.50≤W1/W2≤1.50 (see FIG. 3). In such a configuration, the widths W1, W2 of the recess/protrusion region A1 and the smooth region A2 adjacent to each other are set substantially identical. This has the advantage of effectively exerting the action of the mixed arrangement of the recess/protrusion region A1 and the smooth region A2.

Additionally, in the pneumatic tire 1, the sum ΣW1 of the widths W1 of the recess/protrusion regions A1 and the length Lb' of the road contact surface of the block 4 in the cross-section X have the relationship 0.20≤ΣW1/Lb' (see FIG. 3). This has the advantage of providing the appropriate total width ΣW1 of the recess/protrusion regions A1 within the predetermined lateral range.

Additionally, in the pneumatic tire 1, the sum of the widths W2 of the smooth regions A2 and the length Lb' of the road contact surface of the block 4 in the cross-section X have the relationship 0.20≤ΣW2/Lb' (see FIG. 3). This has the advantage of providing the appropriate total width ΣW2 of the smooth regions A2 within the predetermined lateral range.

Additionally, in the pneumatic tire 1, the area ratio of the recess/protrusion portions 6 in the recess/protrusion region A1 ranges from 20% to 45%. This has the advantage of appropriately ensuring the water film removal action of the recess/protrusion portions 6 in the recess/protrusion region A1.

Additionally, in the pneumatic tire 1, the width Wc of each of the recess/protrusion portions 6 in the recess/protrusion region A1 and the arrangement interval Dc between the recess/protrusion portions 6 have the relationship 0.80≤Dc/Wc (see FIG. 4). This has the advantage of providing the appropriate ground contact area inside the recess/protrusion region A1, thus improving the grounding characteristics of the recess/protrusion region A1 itself.

Additionally, in the pneumatic tire 1, the arrangement interval Dc of the recess/protrusion portions 6 in the recess/protrusion region A1 and the width W2 of the smooth region A2 have the relationship 4.0≤W2/Dc (see FIG. 4). This has the advantage of appropriately exerting the action of the mixed arrangement of the recess/protrusion region A1 and the smooth region A2.

Additionally, in the pneumatic tire 1, the recess/protrusion region A1 is shaped to be long in the tire lateral direction, and the angle θ between the longitudinal center line of the recess/protrusion region A1 and the tire lateral direction is in the range −15 degrees≤θ≤15 degrees (see FIG. 3). This has the advantage of appropriately setting the angle θ in the longitudinal direction of the recess/protrusion region A1 to appropriately ensure the functions of the recess/protrusion region A1.

Additionally, in the pneumatic tire 1, the recess/protrusion regions A1 extend along the edge portions of the road contact surface of the block 4 in the tire circumferential direction (see FIG. 3). This has the advantage of improving drainage characteristics of the road contact surface of the block 4 to improve the tire braking performance on ice and tire turning performance on ice.

Additionally, in the pneumatic tire 1, the smooth regions A2 extend along the edge portions of the road contact surface of the block 4 in the tire lateral direction (see FIG. 20). This has the advantage of increasing the ground contact area of the block 4 to improve the tire braking performance on ice and the tire turning performance on ice.

Additionally, in the pneumatic tire 1, the recess/protrusion portions 6 are narrow shallow grooves (see FIGS. 4 to 7). Such a configuration, in which the recess/protrusion portions 6 have a long structure, has the advantage of efficiently exerting the drainage action of the recess/protrusion portions 6 compared to a configuration in which the recess/protrusion portions 6 are short dimples (see FIG. 34).

EXAMPLE

FIG. 44 is a table showing results of performance tests of pneumatic tires according to embodiments of the technology.

In the performance tests, a plurality of different test tires were evaluated for (1) braking performance on ice and (2) driving performance on ice. Additionally, pneumatic tires with a tire size of 195/65R15 91Q were mounted on a rim having a rim size of 15×6J; and an internal pressure of 210 kPa and a maximum load specified by JATMA were applied to these pneumatic tires. Also, the test tires were mounted on a test vehicle, a front-engine front-drive (FF) sedan with an engine displacement of 1600 cc.

(1) In the evaluation relating to the braking performance on ice, the test vehicle was driven on a predetermined icy road surface and the braking distance from the traveling speed of 40 km/h is measured. The measurement results are expressed as index values and evaluated with the Conventional Example being assigned as the reference (100). In this evaluation, larger values are preferable.

(2) In the evaluation relating to the driving performance on ice, the test vehicle was driven on a predetermined icy road surface and an acceleration time is measured that lasts from a completely inactive state until a travel speed of 20 km/h is reached. The measurement results are expressed as index values and evaluated with the Conventional Example being assigned as the reference (100). In this evaluation, larger values are preferable.

The structures of the test tires according to Examples 1 to 9 are illustrated in FIGS. 1 to 7. Additionally, a circumferential length Lb of the block 4 is Lb=50 mm, and the lateral length Wb of the block 4 is Wb=40 mm. Additionally, the block 4 includes the sipes 5, the depth of each sipe 5 is 7.0 mm, and the width of the sipe 5 is 0.8 mm. Additionally, the road contact surface of the block 4 includes the recess/protrusion region A1 and the smooth region A2, and the recess/protrusion portions 6 of the recess/protrusion region A1 include narrow shallow grooves. Additionally, a plurality of sets of the recess/protrusion region A1 and the smooth region A2 having the predetermined width W1, W2 are disposed side by side in the tire circumferential direction. Additionally, no surface processing portions other than the recess/protrusion portions 6 and the sipes 5 described above are provided on the road contact surface of the block 4, and the block 4 includes a planar road contact surface.

The test tire according to the conventional example corresponds to the test tire according to Example 1 in which the recess/protrusion portions 6 are arranged all over the road contact surface of the block 4.

The test results show that the test tires according to Examples 1 to 9 have improved tire braking performance on ice and driving performance on ice.

The invention claimed is:

1. A pneumatic tire comprising a plurality of blocks on a tread surface;
the blocks each comprising a plurality of recess/protrusion portions on a road contact surface;
a recess/protrusion height Hc of each of the recess/protrusion portions being in a range $0.1 \text{ mm} \leq Hc \leq 1.0 \text{ mm}$;
a width Wc of each of the recess/protrusion portions being in a range $0.1 \text{ mm} \leq Wc \leq 0.8 \text{ mm}$;
a recess/protrusion region being defined as a region where an arrangement interval Dc between the recess/protrusion portions adjacent to each other is in a range $Dc \leq 1.2 \text{ mm}$;
a smooth region being defined as a region other than the recess/protrusion region and in which an arithmetic average roughness Ra of the road contact surface of the blocks is in a range $Ra \leq 50 \text{ μm}$;
a cross-section X perpendicular to a tire lateral direction being defined;
a lateral length Wb of the road contact surface of each of the blocks in the tire lateral direction being defined; and
the blocks each comprising the recess/protrusion region and the smooth region in an optional cross-section X within a lateral range of not less than 40% of the lateral length Wb of the road contact surface of the blocks; wherein
a width W1 of the recess/protrusion region and a width W2 of the smooth region adjacent to the recess/protrusion region have a relationship $0.50 \leq W1/W2 \leq 1.50$;
the smooth region is disposed between adjacent recess/protrusion regions adjacent to each other; and
the recess/protrusion region extends across an entire width of a respective one of the blocks at a widest portion of the one of the blocks.

2. The pneumatic tire according to claim 1, wherein a width W1 of the recess/protrusion region is in a range $1.0 \text{ mm} \leq W1$, and a width W2 of the smooth region is in a range $2.0 \text{ mm} \leq W2$.

3. The pneumatic tire according to claim 1, wherein a sum $\Sigma W1$ of the widths W1 of a plurality of recess/protrusion regions and a length Lb' of the road contact surface of the block in the cross-section X have a relationship $0.20 \leq \Sigma W1/Lb'$.

4. The pneumatic tire according to claim 1, wherein a sum $\Sigma W2$ of the widths W2 of a plurality of smooth regions and the length Lb' of the road contact surface of the block in the cross-section X have a relationship $0.20 \leq \Sigma W2/Lb'$.

5. The pneumatic tire according to claim 1, wherein an area ratio of the recess/protrusion portions in the recess/protrusion region ranges from not less than 20% to not more than 45%.

6. The pneumatic tire according to claim 1, wherein the width Wc of each of the recess/protrusion portions in the recess/protrusion region and the arrangement interval Dc have a relationship $0.80 \leq Dc/Wc$.

7. The pneumatic tire according to claim 1, wherein the arrangement interval Dc between the recess/protrusion portions in the recess/protrusion region and the width W2 of the smooth region have a relationship $4.0 \leq W2/Dc$.

8. The pneumatic tire according to claim 1, wherein
the recess/protrusion region is shaped to be long in the tire lateral direction, and
an angle θ formed between a longitudinal center line of the recess/protrusion region and the tire lateral direction is in a range $-15 \text{ degrees} \leq \theta \leq 15 \text{ degrees}$.

9. The pneumatic tire according to claim 1, wherein the smooth region extends along edge portions of the road contact surface of the block in the tire lateral direction.

10. The pneumatic tire according to claim 1, wherein the recess/protrusion portions are narrow shallow grooves.

11. The pneumatic tire according to claim 1, further comprising a sipe disposed in the smooth region.

12. The pneumatic tire according to claim 1, wherein the recess/protrusion region is devoid of a sipe.

* * * * *